United States Patent
Krueger et al.

(10) Patent No.: US 11,842,476 B2
(45) Date of Patent: *Dec. 12, 2023

(54) SYSTEM AND METHOD FOR MINIMIZING LOST MOTION OF AN AXLE OF A VEHICLE AND FILTERING ERRONEOUS ELECTRICAL SIGNALS

(71) Applicant: BNSF Railway Company, Fort Worth, TX (US)

(72) Inventors: Darrell R. Krueger, Lecompton, KS (US); Corey D. Wills, Berryton, KS (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,441

(22) Filed: Jul. 1, 2022

(65) Prior Publication Data
US 2022/0343491 A1    Oct. 27, 2022

Related U.S. Application Data

(63) Continuation of application No. 17/719,811, filed on Apr. 13, 2022, now Pat. No. 11,423,527, which is a
(Continued)

(51) Int. Cl.
*B61K 9/08* (2006.01)
*G06N 20/00* (2019.01)
(Continued)

(52) U.S. Cl.
CPC ............. *G06T 7/0004* (2013.01); *B61K 9/08* (2013.01); *G06F 18/2431* (2023.01);
(Continued)

(58) Field of Classification Search
CPC ... G06F 18/2431; G06N 20/00; G06T 1/0007; G06T 1/0014; G06T 7/0004; G06T 7/11;
(Continued)

(56) References Cited

U.S. PATENT DOCUMENTS

| 17,911 A | 7/1857 | White |
| 70,283 A | 10/1867 | Staley |

(Continued)

FOREIGN PATENT DOCUMENTS

| CN | 202533046 U | * 11/2012 |
| CN | 202533046 U | 11/2012 |

(Continued)

OTHER PUBLICATIONS

Anonymous ("Method for Analyzing Vehicle Wheel Assembly Rotational Movement Through Eulerian Video Magnification," IP.com, May 6, 2013) (Year: 2013).*

(Continued)

*Primary Examiner* — Yubin Hung
(74) *Attorney, Agent, or Firm* — WHITAKER CHALK SWINDLE & SCHWARTZ PLLC; Enrique Sanchez, Jr.

(57) ABSTRACT

A system and method for monitoring a roadway by comparing captured images to image inconsistencies caused by lost or unnecessary motion and for minimizing lost or unnecessary motion of an axle of a vehicle and filtering erroneous pulses of an electrical signal to generate a trigger signal to capture images is presented. The system enables the minimization of image artifacts causing distortion in an image. The system can take images of a target, compute an object pixel size of the image to ensure calibration of longitudinal measurements, and calibrate the rotary encoder with the camera of the machine vision system. The system can enable calibration of the locomotive components in the (Continued)

field to compensate for the misalignment of the machine vision system and provide safe travels.

20 Claims, 14 Drawing Sheets

Related U.S. Application Data continuation-in-part of application No. 17/194,954, filed on Mar. 8, 2021, now Pat. No. 11,620,743, which is a continuation of application No. 16/196,990, filed on Nov. 20, 2018, now Pat. No. 10,984,521.

(51) Int. Cl.
| | |
|---|---|
| G06T 1/00 | (2006.01) |
| G06T 7/00 | (2017.01) |
| G06T 7/11 | (2017.01) |
| G06V 10/12 | (2022.01) |
| G06F 18/2431 | (2023.01) |

(52) U.S. Cl.
CPC ............... *G06N 20/00* (2019.01); *G06T 7/11* (2017.01); *G06V 10/12* (2022.01); *G06T 1/0007* (2013.01); *G06T 1/0014* (2013.01); *G06T 2207/20132* (2013.01)

(58) Field of Classification Search
CPC .......... G06T 2007/20132; G06V 10/02; G06V 10/12; B61K 9/08
See application file for complete search history.

(56) References Cited

U.S. PATENT DOCUMENTS

| | | | |
|---|---|---|---|
| 88,091 | A | 4/1869 | McMahen |
| 122,569 | A | 1/1872 | Chute |
| 140,509 | A | 7/1873 | Knox |
| 171,704 | A | 1/1876 | Swinburn |
| 196,456 | A | 10/1877 | Howard |
| 304,083 | A | 8/1884 | Edison |
| 4,558,379 | A * | 12/1985 | Hutter ............... G01R 13/06 360/32 |
| 5,068,912 | A | 11/1991 | Concannon et al. |
| 7,200,259 | B1 | 4/2007 | Gold et al. |
| 7,860,640 | B1 | 12/2010 | Wall, III |
| 9,771,090 | B2 | 9/2017 | Warta et al. |
| 10,009,197 | B1* | 6/2018 | Magee ............... G11C 7/1087 |
| 2001/0016061 | A1 | 8/2001 | Shimoda et al. |
| 2002/0075777 | A1* | 6/2002 | Kuwaoka ......... G11B 20/10527 |
| 2002/0186916 | A1* | 12/2002 | Bessios ............. H04B 10/2569 359/107 |
| 2005/0002558 | A1 | 1/2005 | Franke et al. |
| 2008/0086258 | A1 | 4/2008 | Wall |
| 2011/0127938 | A1 | 6/2011 | Kawakami et al. |
| 2012/0300060 | A1* | 11/2012 | Farritor ................ B61K 9/08 348/125 |
| 2013/0190981 | A1 | 7/2013 | Donilar et al. |
| 2013/0270899 | A1* | 10/2013 | Buttolo ................ B60L 1/00 307/116 |
| 2014/0263652 | A1 | 9/2014 | Auger |
| 2015/0254853 | A1 | 9/2015 | Tanaka et al. |
| 2015/0271201 | A1 | 9/2015 | Ruvio et al. |
| 2016/0104061 | A1 | 4/2016 | McGill |
| 2016/0231253 | A1 | 8/2016 | Nygaard et al. |
| 2017/0061623 | A1 | 3/2017 | Jaehnisch et al. |
| 2017/0106885 | A1 | 4/2017 | Singh |
| 2019/0346088 | A1* | 11/2019 | Xiong ................... F21V 3/061 |
| 2020/0019938 | A1 | 1/2020 | Wang et al. |
| 2020/0175352 | A1 | 6/2020 | Cha et al. |
| 2021/0192716 | A1 | 6/2021 | Kohler et al. |

FOREIGN PATENT DOCUMENTS

| | | | |
|---|---|---|---|
| CN | 102954191 A | 1/2013 | |
| EP | 0130428 A1 | 1/1985 | |
| EP | 2073372 B1 | 8/2011 | |
| GB | 2368400 A | 1/2002 | |
| GB | 2368400 A * | 5/2002 | ......... B81C 99/0035 |
| JP | 2008502538 A | 1/2008 | |
| JP | 2008505260 A | 2/2008 | |
| JP | 2010139317 A | 6/2010 | |
| JP | 201226982 A | 2/2012 | |
| JP | 2015178978 A | 10/2015 | |
| JP | 2015178978 A * | 10/2015 | |
| JP | 2016109495 A | 6/2016 | |
| JP | 2017187487 A | 10/2017 | |
| JP | 2018005640 A | 1/2018 | |
| WO | 2006004846 A2 | 1/2006 | |

OTHER PUBLICATIONS

Li et al. ("Improvements in Axle Box Acceleration Measurements for the Detection of Light Squats in Railway Infrastructure," IEEE Transactions on Industrial Electronics , vol. 62, Issue 7; Jul. 2015) (Year: 2015).*

Chellaswamy et al. ("Optimized vehicle acceleration measurement for rail track condition monitoring," International Conference on Computing and Communications Technologies ; Date of Conference: Feb. 23-24, 2017) (Year: 2017).*

Bonta et al. ("The Problem of Speed Measurements in the Slip-Slide Control for Electric Railway Traction," IEEE International Conference on Automation, Quality and Testing, Robotics; Date of Conference: May 25-28, 2006) (Year: 2006).*

Santur et al. ("Random forest based diagnosis approach for rail fault inspection in railways," National Conference on Electrical, Electronics and Biomedical Engineering; Date of Conference: Dec. 1-3, 2016) (Year: 2016).*

Wang et al. ("Detect the rail track flaw by estimating the camera shaking," 17th International IEEE Conference on Intelligent Transportation Systems; Date of Conference: Oct. 8-11, 2014) (Year: 2014).*

Vohra et al. ("Efficient Monitoring System for Railways for Crack Detection," 2nd International Conference on I-SMAC (IoT in Social, Mobile, Analytics and Cloud); Date of Conference: Aug. 30-31, 2018) (Year: 2018).*

Faghih-Roohi, S. et al., "Deep Convolutional Neural Networks for Detection of Rail Surface Defects," 2016 International Joint Conference on Neural Networks (IJCNN), Jul. 24-29, 2016, pp. 2584-2589.

Nagata, F. et al., "Design Application of Deep Convolutional Neural Network for Vision-Based Defect Inspection," 2018 IEEE International Conference on Systems, Man, and Cybernetics (SMC), Oct. 7-10, 2018, pp. 1705-1710.

Papageorgiou, M. et al., "Transportation Systems 1997 (TS'97)," A Proceedings volume from the 8th IFAC/IFIP/IFORS Symposium, vol. 3, Published for the International Federation of Automatic Control, Jun. 18, 1997, pp. 1073-1076.

PCT International Application No. PCT/US2019/062145, international filing date Nov. 19, 2019, International Search Report and Written Opinion, 11 pages.

Dudley, "Means for Recording the Conditions of and Marking Railway Tracks," U.S. Pat. No. 367,708; Aug. 2, 1887, pp. 1-19.

* cited by examiner

SYSTEM AND METHOD FOR MINIMIZING LOST MOTION OF AN AXLE OF A VEHICLE AND FILTERING ERRONEOUS ELECTRICAL SIGNALS

CROSS-REFERENCE TO RELATED APPLICATIONS

The present application is a Continuation of U.S. patent application Ser. No. 17/719,811, now issued as U.S. Pat. No. 11,423,527, filed Apr. 13, 2022, which is a Continuation-in-Part of U.S. patent application Ser. No. 17/194,954, now issued as U.S. Pat. No. 11,620,743, filed Mar. 8, 2021, which is a Continuation of U.S. patent application Ser. No. 16/196,990, now issued as U.S. Pat. No. 10,984,521, filed Nov. 20, 2018, the entireties of which are herein incorporated by reference for all purposes.

TECHNICAL FIELD

This disclosure generally relates to field calibration of image capturing modules, and more specifically to systems and methods for minimizing lost or unnecessary motion of an axle of a vehicle and filtering erroneous pulses of an electrical signal to generate a trigger signal to capture images.

BACKGROUND

Cameras and rotary encoders employed in machine vision systems of a locomotive must be calibrated and in synchronization to deliver a sharp, high contrast, and properly proportioned image. The rotary encoders on the locomotive trigger an image capture module to capture images of the track. Traditional rotary encoders include rotational free motion, such that the axle is not completely engaged. Unfavorably, the axle may be able to be rotated one or two degrees before the encoder engages. Also unfavorably, the free motion between the axle and encoder as well as the journal box and truck pedestal can create excess trigger pulses due to shock and vibration. Such unengaged rotational motion can manifest as large problems in captured image quality, especially those captured when traversing gaps in a rail, a turnout, or a crossing diamond, among others. Accordingly, machine vision object-detection models can only be as good as the input images. During transit, machine vision systems can shift, no longer properly aiming at the track or capturing clear images. Locomotives also generally require replacements and maintenance as the wheels and suspensions of the locomotive wear, which further impact the placement of the machine vision system. Accordingly, machine vision systems on the undercarriage of a locomotive require calibration to synchronize the rotary encoders with the camera to compensate for various image capture obstructions.

Calibrating the machine vision system on the undercarriage of the locomotive can include major operator intervention to remove the machine vision system and calibrate the system in a bench testing environment. After calibrating, the operators are then required to re-attach the machine vision system and repeat redundant processes including stopping the locomotive, reversing the locomotive, and repeatedly passing over a same stretch of track to ensure collection of appropriate images. The calibration process nonetheless can be arduous for the operators of the locomotive. The inefficient processes of modern calibration techniques can incur costly expenses from the repetitive processes, along with wasted time from the operators requiring the bench testing environment. The operators incur opportunity costs from the wasted time.

While the organizational tools and processes to calibrate machine vision system of the locomotives exist in a bench testing environment, the current processes are unfit for calibrating in the field. Additionally, the locomotives travel in all environmental conditions wearing the components of the locomotive and resulting in the movement of the machine vision system and distorted images. Operators currently cannot calibrate the machine vision system while the locomotive is in the field. When the operator needs to calibrate the machine vision system, current methods require the operator to remove the machine vision system and calibrate the machine vision system using the bench testing environment, which proves to be inefficient and burdensome for field operations.

SUMMARY

The present disclosure achieves technical advantages as a system and method for minimizing lost or unnecessary motion of an axle of a vehicle and filtering erroneous electrical signal pulses to generate a trigger signal to capture images. The system enables the minimization of image artifacts causing distortion in an image. The system can take images of a target, compute an object pixel size of the image to ensure calibration of longitudinal measurements, and calibrate the rotary encoder with the camera of the machine vision system. The system can enable calibration of the locomotive components in the field to compensate for the misalignment of the machine vision system and provide safe travels.

Accordingly, the present disclosure discloses concepts inextricably tied to computer technology such that the present disclosure provides the technological benefit of providing a rotary encoder operably coupled to a machine vision system. The present disclosure goes beyond mere bench testing for calibration, incorporating at least the image analysis functionality that can enable accurate calibration for enhanced locomotive safety. The present disclosure can remove the requirement of using a drum to calibrate the machine vision system in the bench testing environment, by replacing the bench testing environment with the machine vision system enabling calibration in the field. By removing the requirement of the bench testing environment, the operators can increase efficiency of travel while ensuring locomotive safety.

The present disclosure improves the performance and functionality of the system itself by coupling a. rotary encoder to a machine vision system for field calibration of image capture modules. Additionally, the present disclosure includes software tools to calculate the calibration between the rotary encoder and a camera of the machine vision system based on pixel counts of images. The rotary encoder can execute according to the wheels of the locomotive, so as the wheels rotate the camera captures an image. Additionally, the system can compare the images captured to known distance values and calibrate the machine vision system based on the comparison.

The system can include an ability to filter electronic signals for triggering an image capture module to instruct a camera to capture images. The rotary encoder of the machine vision system can include software processes to filter the trigger signals to remove asynchronous signals. Current approaches cannot filter the electronic trigger signals resulting in distorted images. The quality of the images directly impacts the effectiveness of the machine vision system. The higher quality the images leads to higher granularity, which results in fewer gaps between pixels of the images from machine vision system.

It is an object of the invention to provide a system for monitoring a roadway by comparing captured images to identify anomalies caused by lost or unnecessary motion. It is a further object of the invention to provide a rotary encoder apparatus. It is a further object of the invention to provide a method for filtering erroneous pulses of an electrical signal to generate a trigger signal to capture images. It is a further object of the invention to provide a beam system. These and other objects are provided by at least the following embodiments.

In one embodiment, a system for monitoring a roadway by comparing captured images to identify anomalies caused by lost or unnecessary motion, comprising: a mechanical coupler operably coupled to the axle for minimizing the lost or unnecessary motion from the axle; and a rotary encoder, operably coupled to the mechanical coupler, comprising: a memory for storing timeframe metadata and signal samples corresponding to an electrical signal generated by the rotary encoder; and a processor that is configured to generate the trigger signal by performing the steps of: collecting samples during the current time frame of an electrical signal generated in response to a rotation of the axle; generating metadata of the samples including first signal values of the current timeframe; comparing the first signal values of the current timeframe with second signal values of a previous timeframe when the erroneous pulses are present in the electrical signal; updating the samples and metadata of the current timeframe when the first signal values of the current timeframe are different from the second signal values of the previous timeframe; and generating a trigger signal; and at least two beams, wherein each of the at least two beams includes at least one image capturing module, operably coupled to the rotary encoder, for acquiring at least one high-resolution image according to high signal values of the trigger signal. Wherein when the processor updates the samples and metadata of the current timeframe, the processor is further configured to perform the steps: calculating an averaged signal based on historic signal values including averaged metadata and averaged samples; replacing the metadata with the averaged metadata; replacing the samples with the averaged samples; and generating the trigger signal including the averaged signal. Wherein when the processor updates the samples and metadata of the current timeframe, the processor is further configured to perform the steps replacing the first signal values of the current timeframe with the second signal values of the previous timeframe. Wherein the metadata includes a number of signal peaks of the electrical signal, a frequency of the electrical signal, an encoder rate, a rotation of the axle, or a transform of the electrical signal. Wherein the averaged signal is based on a moving average signal calculation and historic signal values. Wherein the processor is further configured to perform the step of transmitting the trigger signal to the image capturing module. Wherein the erroneous pulses are present when the electrical signal of the current time frame includes pulses out of sync with a rotation of the axle. Wherein the first signal values include a voltage, an amplitude, and a frequency. Wherein the lost or unnecessary motion includes torsional rigidity, torsional stiffness, or slack.

In another embodiment, a rotary encoder, comprising: a memory for storing timeframe metadata and signal samples corresponding to a signal generated by the encoder; and a processor that is configured to generate the trigger signal by performing the steps of: collecting samples during the current time frame of an electrical signal generated in response to a rotation of the axle; generating metadata of the samples including first signal values of the current timeframe; when the erroneous pulses are present in the electrical signal, comparing the first signal values of the current timeframe with second signal values of a previous timeframe; when the first signal values of the current timeframe are different from the second signal values of the previous timeframe, updating the samples and metadata of the current timeframe; and generating a trigger signal. Wherein when the processor updates the samples and metadata of the current timeframe, the processor is further configured to perform the steps: calculating an averaged signal based on historic signal values including averaged metadata and averaged samples; replacing the metadata with the averaged metadata; replacing the samples with the averaged samples; and generating the trigger signal including the averaged signal. Wherein when the processor updates the samples and metadata of the current timeframe, the processor is further configured to perform the steps replacing the second signal values of the previous timeframe as the first signal values of the current timeframe. Wherein the metadata includes a number of signal peaks of the electrical signal, a frequency of the electrical signal, an encoder rate, a rotation of the axle, or a transform of the electrical signal. Wherein the averaged signal is a smoothed signal based on a moving average signal calculation and historic signal values. Wherein the processor is further configured to perform the step of transmitting the trigger signal to the high-resolution camera array. Wherein the erroneous pulses are present when the electrical signal of the current time frame includes pulses out of sync with a rotation of the axle. Wherein the first signal values include a voltage, an amplitude, and a frequency In another embodiment, method for filtering erroneous pulses of an electrical signal to generate a trigger signal to capture images, comprising: collecting samples during the current time frame of an electrical signal generated in response to a rotation of the axle; generating metadata of the samples including first signal values of the current timeframe; when the erroneous pulses are present in the electrical signal, comparing the first signal values of the current timeframe with second signal values of a previous timeframe; when the first signal values of the current timeframe are different from the second signal values of the previous timeframe, updating the samples and metadata of the current timeframe; and generating a trigger signal. Wherein when the processor updates the samples and metadata of the current timeframe, the processor is further configured to perform the steps: calculating an averaged signal based on historic signal values including averaged metadata and averaged samples; replacing the metadata with the averaged metadata; replacing the samples with the averaged samples; and generating the trigger signal including the averaged signal. Wherein when the processor updates the samples and metadata of the current timeframe, the processor is further configured to perform the steps replacing the second signal values of the previous timeframe as the first signal values of the current timeframe. Wherein the metadata includes a number of signal peaks of the electrical signal, a frequency of the electrical signal, an encoder rate, a rotation of the axle, or a transform of the electrical signal. Wherein the averaged signal is a smoothed signal based on a moving average signal calculation and historic signal values. Wherein the processor is further configured to perform the step of transmitting the trigger signal to the high-resolution camera array. Wherein the erroneous pulses are present when the electrical signal of the current time frame includes pulses out of sync with a rotation of the axle. Wherein the first signal values include a voltage, an amplitude, and a frequency.

In another embodiment, a beam system, comprising: at least two sub-beams, wherein each of the at least two sub-beams includes: at least one image capturing module, operably coupled to a rotary encoder, for acquiring at least one high-resolution image according to high signal values of the trigger signal, wherein each of the at least one image capturing module includes a camera and a lens; a memory for storing at least one of image in response to the camera receiving the trigger signal; and a processor that is configured to control operation of the camera and transmit the at least one image, by performing the program steps of: queueing messages to capture the at least one image, wherein the messages are in response to the trigger signal; capturing the at least one image in response to the messages. Wherein each of the at least two sub-beams includes three image capturing modules. Wherein the memory is further configured to store a machine vision model and the processor is further configured to apply the machine vision model to the at least one image. Wherein a weight of one of the at least two sub-beams is less than a weight of a full beam, and wherein a length of one of the at least two sub-beams is less than a length of the full beam. Wherein the at least two sub-beams further includes a lighting array to illuminate a roadway.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The disclosure presented in the following written description and the various features and advantageous details thereof, are explained more fully with reference to the non-limiting examples included in the accompanying drawings and as detailed in the description, which follow. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can visualize or recognize the members of the genus. Accordingly, these examples should not be construed as limiting the scope of the claims.

Figure 1:
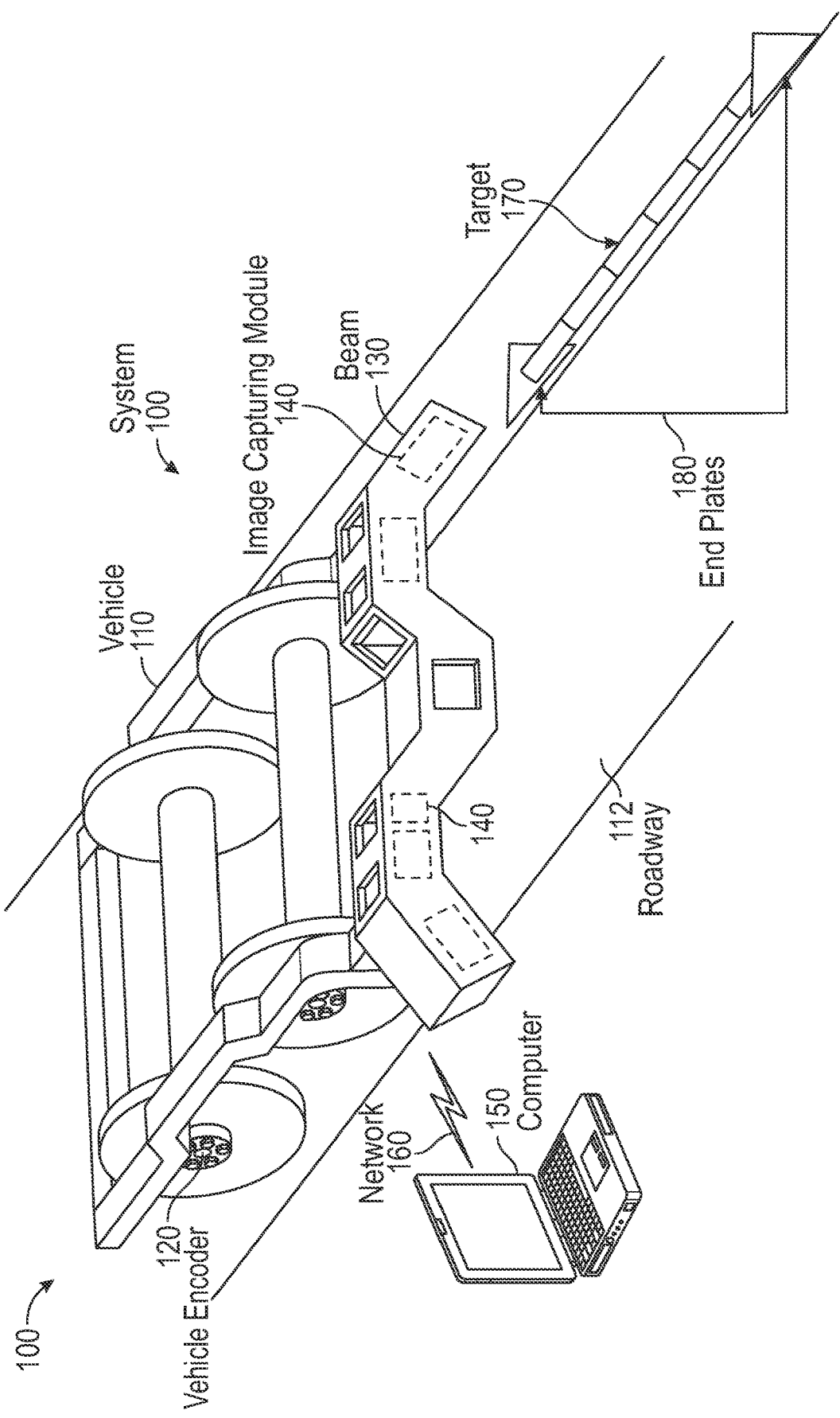
FIG. 1 illustrates an example system for field calibrating an image capturing module and a vehicle encoder, in accordance with one or more embodiments of the present disclosure.

FIG. 1 illustrates an example system 100 for field calibrating an image capturing module 140. The system 100 or portions thereof can be associated with an entity, which can include any entity, such as a business, company (e.g., a railway company, a transportation company, etc.), or a government agency (e.g., a department of transportation, a department of public safety, etc.) that field calibrates image capturing module 140. The elements of the system 100 can be implemented using any suitable combination of hardware, firmware, and software. For example, the elements of the system 100 can be implemented using one or more components of the computer system of FIG. 9.

The system 100 includes a vehicle 110, a vehicle encoder 120, a beam 130, one or more image capturing modules 140, a computer 150, a network 160, and a target 170.

The vehicle 110 can include any machine capable of automated movement. Vehicle 110 can be a car, a locomotive, a truck, a bus, an aircraft, or any other machine suitable for mobility. The vehicle 110 can operate at any speed that allows one or more components (e.g., sensors, cameras, etc.) of beam 130 to capture images. For example, the vehicle 110 can be a rail bound vehicle that travels at 65 miles per hour (mph).

The roadway 112 can include any path that accommodates the vehicle 110. For example, the vehicle 110 can travel along the roadway 112. The roadway 112 can include a road, a highway, a railroad track, a water way, and the like.

The vehicle encoder 120 can include a rotary encoder or other timing device used to measure axle rotation. The vehicle encoder 120 can measure the number of times an axle makes a revolution. The vehicle encoder 120 can be attached to an axle of the vehicle 110. The vehicle encoder 120 can be physically and/or logically connected to one or more components of the system 100. For example, the vehicle encoder 120 can be physically and/or logically connected to one or more cameras and/or sensors of the image capturing module 140. As another example, the vehicle encoder 120 can be physically and/or logically connected to the computer 150.

The vehicle encoder 120 can communicate with the image capturing module 140 to ensure that a camera captures images of the same perspective and proportion regardless of the speed of travel of the vehicle 110. For example, the vehicle encoder 120 can be synchronized with multiple cameras of the image capturing modules 140 to ensure that all cameras are taking images at the same time. As another example, the vehicle encoder 120 can be synchronized with a camera of the image capturing module 140 to ensure that a camera traveling with the vehicle 110 at a first speed (e.g., 10 miles per hour) captures images that are the same perspective and proportion of a camera traveling with the vehicle 110 at a second speed (e.g., 65 miles per hour).

In another embodiment, the vehicle encoder 120 can couple with the vehicle 110 in a mechanical manner to reduce or eliminate lost or unnecessary motion resulting in undesirable artifacts in images generated from the image capturing module 140. For example, the lost or unnecessary motion can include slack in the mechanical coupling resulting in distortion in the images. In another embodiment, the mechanical manner can reduce the lost or unnecessary motion using components machined specifically for the vehicle encoder. For example, the components machined specifically for the vehicle encoder can ensure flexible and rigid fitting to minimize vibration and other mechanical interference resulting in the lost or unnecessary motion.

In another embodiment, the vehicle encoder 120 can couple with the image capturing module 140 in an electrical manner including an electronic filter. For example, the electronic filter can filter trigger signals sent to the camera of the image capturing module 140 smoothing the trigger filter signal to compensate for asynchronous signal elements. In one embodiment, the asynchronous signal elements can be smoothed from using an averaging filter to pass the trigger signal values over a user-defined time frame. For example, the averaging filter can recreate a smoothed trigger signal to distribute to the camera of the image capturing module 140. In another embodiment, the electronic filter can be executed by the encoder (e.g., the vehicle encoder 120) and can receive user-defined number of pulses. In one embodiment, the electronic filter can be executed on an encoder and receives a variable number of pulses over a user-defined time frame.

The beam 130 can include a structure that contains and orients components (e.g., the image capturing modules 140) used to capture images. In certain embodiments, the beam 130 operates similar to a flatbed document scanner with the exception that the beam 130 can be in motion while capturing images of stationary physical objects. The beam 130 can engage with the vehicle 110. For example, the beam 130 can be bolted to a sub-frame attached to the vehicle 110. In the illustrated embodiment of FIG. 1, the beam 130 has three sections that include two end sections and a center section. The beam 130 has a gullwing configuration such that the center section bends inward toward the center of the beam 130. The gullwing configuration allows the image capturing components (e.g., sensors, cameras, etc.) of the image capturing modules 140 within the beam 130 to be properly oriented within with respect to the physical objects being captured. In certain embodiments, the center section of the beam 130 can be omitted, and each end section can be operably coupled to vehicle 110. The beam 130 can be made of metal (e.g., steel or aluminum), plastic, or any other material suitable for housing components of the beam 130 and for attaching the beam 130 to the vehicle 110.

The beam 130 can include one or more openings. Openings can provide for the placement of the image capturing modules 140 within the beam 130. Openings can allow for installation, adjustment, and maintenance of the image capturing modules 140. While the beam 130 is illustrated in FIG. 1 as having a particular size and shape, the beam 130 can have any size and shape suitable to house and orient the image capturing modules 140. Other factors that can contribute to the design of the beam 130 include shock resistance, vibration resistance, weatherproofing considerations, durability, ease of maintenance, calibration considerations, and ease of installation.

In another embodiment, the beam 130 can include a plurality of sub-beams. For example, the beam 130 can include two separate sub-beams, each including a plurality of cameras. In one embodiment, the system 100 with the plurality of sub-beams can reduce complexity of maintenance and simplify construction of each of the sub-beams. In another embodiment, the system 100 with the plurality of sub-beams can reduce complexity of maintenance by reducing a number of personnel needed resulting in the maintenance of control in construction tolerances. For example, the sub-beams can include 33% fewer welds and cuts to construct compared to a full beam.

The image capturing modules 140 of system 100 can be used to capture images while the vehicle 110 is in motion. Each the image capturing module 140 can include one or more sensors, one or more cameras, and the like. One or more the image capturing modules 140 can be attached to the vehicle 110 at any location that allows the image capturing modules 140 to capture images of the environment surrounding the vehicle 110. In the illustrated embodiment of FIG. 1, the image capturing modules 140 are located within the beam 130.

In certain embodiments, each end section of the beam 130 houses one or more the image capturing modules 140. For example, a first end section of the beam 130 can house the image capturing module 140 that includes two downward facing cameras that capture images of tie and ballast areas of a rail. The first end section of the beam 130 can house the two downward facing cameras in a portion of the first end section that can be substantially horizontal to the rail. The second end section of the beam 130 opposite the first end section can house two of the image capturing modules 140 that each include two angled cameras that capture images of both sides of the rail and rail fastening system. The second end section of the beam 130 can house the four angled cameras in portions of the second end section that are at an angle (e.g., a 45 degree angle) to the rail.

The image capturing modules 140 can include various types of sensors depending on sensing and/or measuring requirements. Sensors housed by the image capturing modules 140 can include optical sensors (e.g., cameras for visible light (mono and color), infrared, UltraViolet, and/or thermal), motion sensors (e.g., gyroscopes and accelerometers), light detection and ranging (LIDAR) sensors, hyperspectral sensors, Global Positioning System (GPS) sensors, and the like. Optical sensors and lasers can be used together for laser triangulation to measure deflection or profile. LIDAR sensors can be used for generating three-dimensional (3D) point-cloud data. Hyperspectral sensors can be used for specific wavelength responses. An example of the image capturing module 140 is described in FIG. 2 below.

The computer 150 can represent any suitable computing component that can be used to process information for system 100. The computer 150 can coordinate one or more components of system 100. The computer 150 can receive data from the image capturing modules 140 and/or the vehicle encoder 120. The computer 150 can monitor inputs and/or outputs of the image capturing modules 140 and/or the vehicle encoder 120. The computer 150 can include a communications function that allows users (e.g., a technician) to engage the system 100 directly. For example, a user can access the computer 150 through an interface (e.g., a screen, a graphical user interface (GUI), or a panel) of the computer 150. The computer 150 can be a laptop computer, a desktop computer, a smartphone, a tablet, a personal digital assistant, a wearable computer, and the like. The computer 150 can be located inside or external to the vehicle 110. The computer 150 can communicate with one or more components of the system 100 via the network 160.

The network 160 can include any type of network that facilitates communication between components of the system 100. One or more portions of the network 160 can include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. One or more portions of the network 160 can include one or more access (e.g., mobile access), core, and/or edge networks. The network 160 can be any communications network, such as a private network, a public network, a connection through Internet, a mobile network, a Wi-Fi network, a Bluetooth network, etc. One or more components of system 100 can communicate over the network 160. For example, the computer 150 can communicate over the network 160, including receiving information from the image capturing modules 140 and/or the vehicle encoder 120.

The target 170 can include an object used to calibrate the image capturing module 140 and/or the vehicle encoder 120. For example, the target 170 can include a calibration bar. In one embodiment, the calibration bar can include a cylindrical object made of a sturdy material. For example, the sturdy material can include aluminum (or some other metal), PVC, wood, or some other material suitable for stabilizing the calibration bar. In another embodiment, the target 170 can include a calibration pattern, which can be any suitable size, shape, and/or design. For example, the calibration pattern design can include alternating solid colors, a checkerboard pattern, a chessboard pattern, a circle grid pattern, a CharucoBoard pattern, and the like. For example, the calibration pattern can be a printed black-and-white alternating pattern that includes multiple black and white sections. In another embodiment, the calibration pattern can include units with an unequal length to width ratio. For example, the length of each unit can be twice as long as the width of each unit.

The end plates 180 can include at least one object to which the target 170 attaches. For example, the end plates 180 can include structures to stabilize a position of the target 170. In one embodiment, the structures can be metallic (e.g., aluminum), plastic, wooden, or some other sturdy material for stabilizing the target 170. In another embodiment, the end plates 180 can be used to stabilize the target 170 for purposes of calibrating the image capturing module 140. In one embodiment, the end plates 180 are placed along the rail by the operator. For example, the end plates 180 can include components small and light enough to be movable for the operator. Alternatively, the end plates 180 can be stationary, as part of the rail.

In operation, a vehicle encoder rate can be programmed into the vehicle encoder 120. The vehicle encoder rate can be a number of electrical pulses generated by vehicle encoder 120 in one revolution of a shaft of the vehicle encoder 120. The vehicle encoder rate can be determined from calibration data previously generated during bench calibration procedures, as described in FIGS. 3 and 5 below. If bench calibration data is not available, an arbitrary initial value for the vehicle encoder rate can be programmed into the vehicle encoder 120. In one or more embodiments, the vehicle encoder rate programmed into the vehicle encoder 120 can be an integer. In another embodiment, an operator can program the vehicle encoder rate into the vehicle encoder 120.

The vehicle encoder 120 and the image capturing module 140 of the system 100 are secured to the vehicle 110. The target 170 can be secured to the roadway 112 in view of the camera of the image capturing module 140 to be calibrated. The target 170 can be located perpendicularly to the axis of the camera of the image capturing module 140. The camera of the image capturing module 140 can be activated, and an operator observes the current focus of the camera under constant lighting conditions. In one embodiment, if the contrast between two pixels identifying the boundary of light and dark portions of the target 170 is less than a maximum obtainable contrast (or less than observed during bench calibration procedures), the operator can unlock the focus mechanism of the camera and adjusts the focus until a maximum contrast is achieved. The focus mechanism can then be locked.

The image capturing module 140 can be connected to the computer 150 via the network 160. The computer 150 includes image capturing software. The image capturing module 140 captures a first image of the target 170, which can be displayed on the computer 150. The operator determines a number of lateral pixels in a lateral pitch distance of the first image of the target 170 and determines a lateral object pixel size (OPS) by dividing the pitch of the target 170 by the number of lateral pixels in the pitch region. A trial vehicle encoder rate can then be determined by dividing the wheel circumference of the vehicle 110 by the lateral OPS. If the trial vehicle encoder rate is different than the initial vehicle encoder rate programmed into the vehicle encoder 120, the trial vehicle encoder rate can be programmed into the vehicle encoder 120. The image capturing software of the computer 150 can be triggered off of the vehicle encoder 120 and the vehicle 110 can be moved forward or backward over the target 170.

The image capturing device 140 can capture additional images (e.g., a second or subsequent image or set of images) of the target 170 while the vehicle 110 is moved over the target 170. The computer 150 or an operator of the computer 150 can determine (e.g., counts) a number of light or dark longitudinal pixels in one longitudinal pitch distance of each of the second images and compare the number of lateral pixels to the number of longitudinal pixels. If the number of lateral pixels matches the number of longitudinal pixels, the image capturing module 140 and the vehicle encoder 120 are calibrated. If the number of lateral pixels is different from the number of longitudinal pixels, the vehicle encoder rate can be adjusted until number of lateral pixels matches the number of longitudinal pixels. As such, the system 100 can be used to calibrate the image capturing module 140 and the vehicle encoder 120 to ensure sufficient images are captured by the system 100 that can be used to accurately identify objects in the environment surrounding the vehicle 110.

Although FIG. 1 illustrates a particular arrangement of the vehicle 110, the vehicle encoder 120, the beam 130, the image capturing modules 140, the computer 150, the network 160, and the target 170, this disclosure contemplates any suitable arrangement of the vehicle 110, the vehicle encoder 120, the beam 130, the image capturing modules 140, the computer 150, the network 160, the target 170, and the end plates 180. For example, the computer 150 can be located inside the vehicle 110. The vehicle 110, the vehicle encoder 120, the beam 130, the image capturing modules 140, and the computer 150 can be physically or logically co-located with each other in whole or in part.

Although FIG. 1 illustrates a particular number of the vehicles 110, vehicle encoders 120, beams 130, image capturing modules 140, computers 150, networks 160, and targets 170, this disclosure contemplates any suitable number of the vehicles 110, vehicle encoders 120, beams 130, image capturing modules 140, computers 150, networks 160, targets 170, and end plates 180. For example, the system 100 can include a first beam at a front end of the vehicle 110 and a second beam at a rear end of the vehicle 110. As another example, the system 100 can include multiple computers 150. One or more components of the system 100 can be implemented using one or more components of the computer system of FIG. 9.

Figure 2:
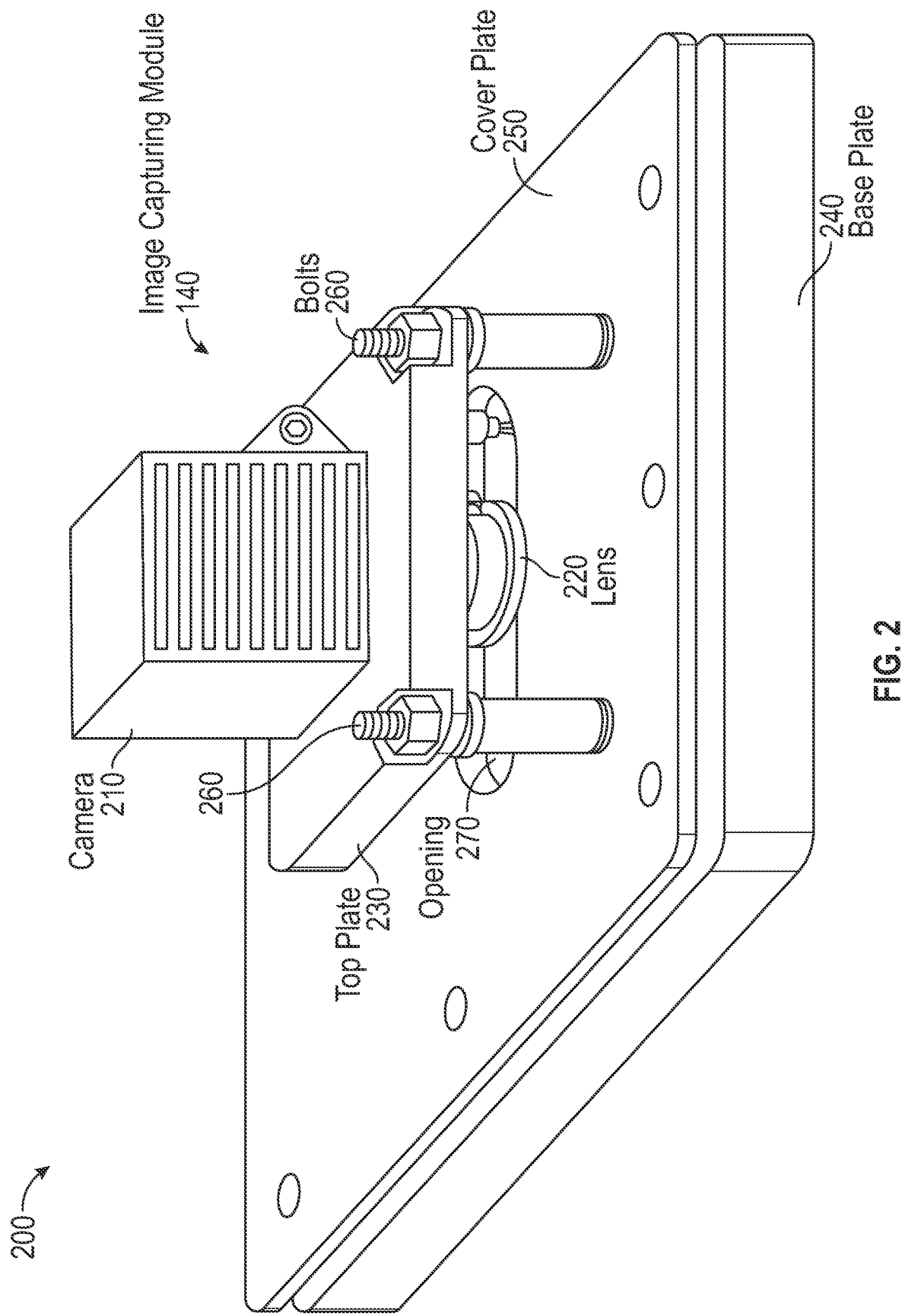
FIG. 2 illustrates an example image capturing module that can be used by the system of FIG. 1, in accordance with one or more embodiments of the present disclosure.

FIG. 2 illustrates an example image capturing module 140 that can be used by system 100 of FIG. 1. Image capturing module 140 includes a camera 210, a lens 220, a top plate 230, a base plate 240, a cover plate 250, bolts 260, and an opening 270. Camera 210 can be any device that captures images. For example, camera 210 can capture images of the target 170 and end plates 180 of FIG. 1. As another example, camera 210 can capture images of a rail component (e.g., a rail joint, a switch, a frog, a fastener, ballast, a rail head, and/or a rail tie). In certain embodiments, camera 210 includes one or more sensors. In another embodiment, the camera 210 can communicate with a memory for storing at least one of image in response to the camera receiving the trigger signal and a processor that can be configured to control operation of the camera and transmit the at least one image, by performing program steps.

One or more cameras 210 can capture images from different angles. For example, one or more cameras 210 can capture images of both rails of a railway system at any given location. Each beam (e.g., beam 130 of FIG. 1) can include multiple cameras 210. The beam can include first camera 210 aimed straight down to capture an overhead image of a target (e.g., target 170 of FIG. 1), a physical object, etc. The beam can include second camera 210 aimed downward and outward to capture an angled image of the target, a physical object, etc.

Camera 210 can be a line scan camera. A line scan camera includes a single row of pixels. Camera 210 can be a dual line scan camera. A dual line scan camera includes two rows of pixels that can be captured and/or processed simultaneously. As camera 210 moves over a physical object, camera 210 can capture images such that a complete image of the physical object can be reconstructed in software line by line. Camera 210 can have a capture rate up to 140 kilohertz. Camera 210 can have a resolution and optics to detect physical objects of at least 1/16 inches in size. In certain embodiments, camera 210 includes lens 220 that focuses and directs incident light to a sensor of camera 210. Lens 220 can be a piece of glass or other transparent substance. Lens 220 can be made of any suitable material (e.g., steel, aluminum, glass, plastic, or a combination thereof.)

Top plate 230 and base plate 240 are structural elements used to position, support, and/or stabilize one or more components of image capturing module 140 (e.g., camera 210 or a sensor). Top plate 230 and bottom plate 540 can be made of any suitable material (e.g., steel, aluminum, plastic, glass, and the like). Top plate 230 can be connected to base plate 240 with one or more bolts 260. Bolts 260 (e.g., jack bolts) can be used to alter a pitch and/or roll orientation of camera 210. For example, bolts 260 can be used to change an effective height between top plate 230 and base plate 240. Top plate 230 and/or base plate 240 can be adjusted to reduce vibration and/or shock of image capturing module 140. Top plate 230 and/or base plate 240 can include resistive heating elements to provide a warm environment for camera 210 and lens 220 to operate during cooler weather.

Cover plate 250 can be a plate that covers base plate 240. Cover plate 250 can be made of any suitable material (e.g., glass, steel, aluminum, and the like). Cover plate 250 includes an opening 270. Opening 270 can serve as an aperture through which a lens of camera 210 views the physical object. Opening 270 allows for transmission of a sensed signal from the surrounding environment to reach a sensor of camera 210. Opening 270 can be any suitable size (e.g., oval, rectangular, and the like) to accommodate views of camera 210. Lens 220 of camera 210 can be positioned directly over opening 270.

Although FIG. 2 illustrates a particular arrangement of camera 210, lens 220, top plate 230, base plate 240, cover plate 250, bolts 260, and opening 270, this disclosure contemplates any suitable arrangement of camera 210, lens 220, top plate 230, base plate 240, cover plate 250, bolts 260, and opening 270. Although FIG. 2 illustrates a particular number of cameras 210, lenses 220, top plates 230, base plates 240, cover plates 250, bolts 260, and openings 270, this disclosure contemplates any suitable number of cameras 210, lenses 220, top plates 230, base plates 240, cover plates 250, bolts 260, and openings 270. For example, image capturing module 140 can include multiple cameras 210. As another example, in certain embodiments, image capturing module 140 cannot include certain components (e.g., base plate 240) illustrated in FIG. 2. One or more components of image capturing module 140 can be implemented using one or more elements of the computer system of FIG. 9.

Figure 3:
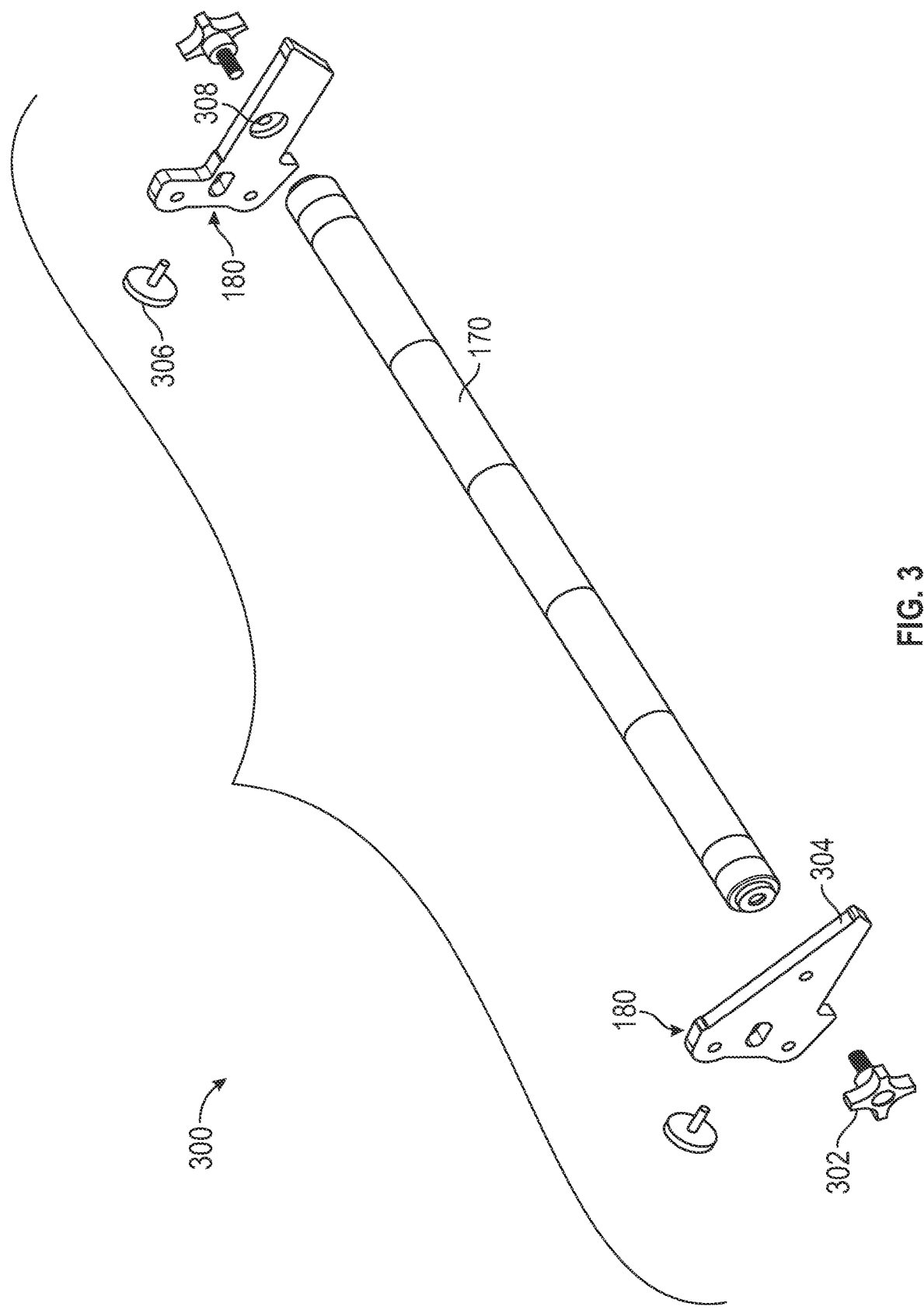
FIG. 3 illustrates an example system for an adaptable calibration target, in accordance with one or more embodiments of the present disclosure.

FIG. 3 illustrates an example system 300 for an adaptable calibration target. System 300 includes a roadway (e.g., roadway 112 of FIG. 1) moving under a locomotive. System 300 or portions thereof can be associated with an entity, which can include any entity, such as a business, company (e.g., a railway company, a transportation company, etc.), or a government agency (e.g., a department of transportation, a department of public safety, etc.) that calibrates an image capturing module in the field. System 300 of FIG. 3 includes the target 170, the end plates 180, a screw caps 302, a marker strip 304, an attachment apparatus 306, and fastener hole 308.

The screw caps 302 can couple the target 170 to the end plates 180. For example, the screw caps 302 can include a mechanical coupler, such as a screw, bolt, cotter pin, or another mechanical coupler. In one embodiment, the operator of the locomotive will exit the locomotive, attach the end plates 180 to a rail, and couple each end of the target 170 to each of the end plates 180 using the screw caps 302. In another embodiment, the operator can rotate the screw caps 302 to attach and detach the system in the field.

The marker strip 304 can include a solid black strip on a top of the end plates. For example, the marker strip 304 can include a strip of known length for calibration purposes. In one embodiment, the marker strip 304 can be used to calibrate an image system on the locomotive by providing a known lateral distance. For example, the marker strip 304 can include a length of 5 inches. In another embodiment, the image system can capture an image of the marker strip 304 and analyze the image to determine whether the image system is calibrated. In another embodiment, the image with the marker strip 304 can provide a number of lateral pixels for analysis.

The attachment apparatus 306 can couple the end plates 180 to the rail. For example, the attachment apparatus 306 can couple the end plates 180 to the rail by a mechanical, electrical, or magnetic manner. In one embodiment, the attachment apparatus 306 can include a mechanical component to couple the end plates 180 to the rail. For example, the mechanical component can include a clamp, bolt, screw, cotter pin, or some other mechanical coupler. In another embodiment, the attachment apparatus 306 can include an electrical component to couple the end plates 180 to the rail. For example, the electrical component can include an electromechanical clamp, electromagnetic coupler, or some other electrical coupler. In another embodiment, the attachment apparatus 306 can include a magnetic component to couple the end plates 180 to the rail. For example, the magnetic component can include a magnetic disc, strip, or paint manually placed by the operator. In another embodiment, the attachment apparatus 306 can be removable from the end plates 180. Alternatively, the attachment apparatus 306 can be permanently attached to the end plates 180.

The fastener hole 308 can couple the target 170 to the end plates 180. For example, the fastener hole 308 can interconnect the target 170 to the screw caps 302. In another embodiment, the fastener hole 308 can be part of the end plates 180 or another base to which the target 170 is applied.

In operation, a user (e.g., an operator) installs an image capturing module (e.g., image capturing module 140 or portions thereof such as camera 210 of FIG. 2) on an undercarriage of a locomotive and connects one or more components of the image capturing module to a computer (e.g., computer 150). The computer can include image capturing software. The user turns (e.g., switches) on the power of the image capturing module. The user unlocks the focus locking mechanism of the image capturing module and focuses a camera of the image capturing module on target 170 under constant lighting conditions.

In an embodiment, the operator can perform a field calibration assessment discussed below. For example, the field calibration assessment can include a successful focus achieved when maximum contrast is obtained between two pixels identifying the boundary of the light and dark portion of calibration pattern of the target 170 (e.g., alternating colors or a checkerboard pattern). In one embodiment, the user then locks the focusing mechanism of the image capturing module. In another embodiment, the operator can identify an image displayed on the computer, the user observes a black or white region on the target 170 in the middle of a field of view of the camera. For example, the field of view can represent an angle through which the camera of the image capturing module picks up electromagnetic radiation. In one embodiment, the field of view can be limited by the area of the image displayed on the computer.

In another embodiment, the operator of the computer can count the number of light or dark pixels in a first direction for a lateral pitch distance of the end plates 180. In one embodiment, the first direction can be parallel to an axis of the end plates 180. In another embodiment, a lateral OPS can be calculated by dividing the lateral pitch distance by the number of pixels in the lateral pitch distance. For example, if the lateral pitch distance equals one inch and the number of pixels for the one-inch pitch distance can be 52, the lateral OPS equals one inch divided by 52, which equals 0.01923 inches per pixel. In one embodiment, the lateral OPS can indicate a true physical dimension represented by one pixel at a prescribed working distance. For example, the working distance can include a distance between the camera and the target. In another embodiment, the lateral OPS can be determined based on a field calculation as follows:

$$OPS_{lateral} = \frac{P_{target}}{n_{pixels}}.$$

Where $P_{target}$ can be the pitch of the target in units of length, and $n_{pixels}$ can be a determined number of pixels. For example, the determined number of pixels can include a number of pixels counted by the operator. Alternatively, the determined number of pixels can include a number of pixels based on characteristics of the camera, such as image size, lens dimensions, and image resolution. In one embodiment, measuring and calibrating the lateral OPS ensures that the objects depicted in images captured by the image capturing module are properly proportioned and that no data is lost between pixels when the image capturing module is in field operation. In another embodiment, the pixels are square or approximately square (e.g., having an equal length and width within a two percent tolerance). For example, an allowance can be permitted due the limitations of the camera of the image capturing module and/or a vehicle encoder (e.g., vehicle encoder 120).

In another embodiment, the field calibration assessment can include determining a vehicle encoder rate for the vehicle encoder based on the lateral OPS. In one embodiment, the vehicle encoder rate can equal the number of electrical pulses generated by the vehicle encoder in one revolution of the shaft of the wheel. For example, the vehicle encoder rate can be calculated as the circumference of the wheel divided by the lateral OPS. In another embodiment, the vehicle encoder rate for the vehicle encoder can be determined based on the lateral OPS. For example, the encoder rate can be based on the following equation:

$$R_{encoder,wheel} = \frac{(k_{fg}) * (c_{wheel})}{OPS_{lateral}}.$$

Where $k_{fg}$ is a triggering factor set in the camera or in software and heel is the circumference of the wheel.

In certain embodiments, the encoder rate can be programmed into the vehicle encoder as an integer value. For example, the vehicle encoder rate can be programmed into the vehicle encoder as an integer value. In one embodiment, the vehicle encoder can be programmed to 1715 or 1716 pulses per revolution. For example, an operator can operate a vehicle (e.g., the vehicle 110) over the target 170 at a low speed. In one embodiment, the low speed can be within a range of five to twenty mph (e.g., 10 mph). In another embodiment, the image capturing module can capture images while the locomotive is traveling the low speed and communicates the collected images to the computer. In one embodiment, the operator of the computer determines (e.g., counts) the number of light or dark pixels in a second direction in one longitudinal pitch distance on the target 170. For example, in the illustrated embodiment of FIG. 3, the second direction can be parallel to an axis of the target 170.

The operator can then operate the vehicle at a high speed. For example, the high speed can be within a range of fifty to eighty miles per hour (mph) (e.g., such as 65 mph). The high speed can represent the maximum speed of the vehicle. The image capturing module can capture images while the vehicle is traveling at the high speed and communicates the captured images to the computer. The operator of the computer determines (e.g., counts) the number of light or dark pixels in one pitch distance on the target 170 in the second direction. The high and low speed longitudinal pixel counts are compared to the lateral pixel counts to determine if the camera pixels are representing physical space equally in the lateral and longitudinal directions. If the longitudinal pixel counts are different than the lateral pixel counts, a different encoder rate can be programmed into the vehicle encoder, and the above process can be repeated to compare the effects of the new encoder rate on the pixel counts in the lateral and longitudinal directions.

Figure 4:
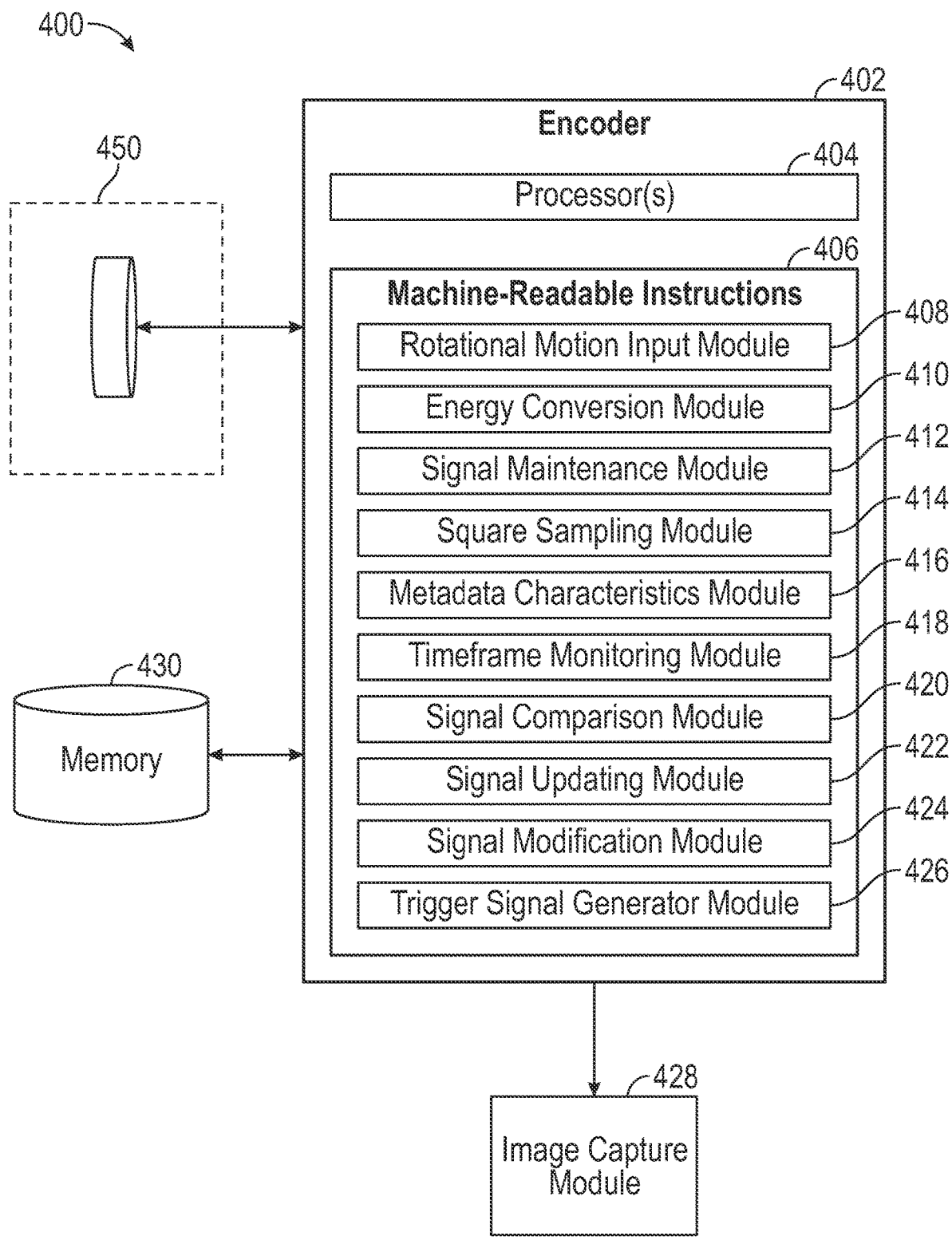
FIG. 4 illustrates an example of a triggering system, in accordance with one or more embodiments of the present disclosure.

FIG. 4 illustrates a schematic view of a triggering system 400, in accordance with one or more embodiments of the present disclosure. The system 400 can include an encoder 402 having one or more processor(s) 404, a memory 430, machine readable instructions 406, including a rotational motion input module 408, energy conversion module 410, signal maintenance module 412, signal sampling module 414, metadata characteristics module 416, timeframe monitoring module 418, signal comparison module 420, signal updating module 422, signal modification module 424, trigger signal generator module 426, among other relevant modules. The encoder 402 can be operably coupled to an image capture module 428 and one or more axle assembly 450 of a vehicle. The image capture module 428 can include a high-resolution camera array for acquiring at least one high-resolution image. The axle assembly 450 can include an axle adapter, a mechanical coupler, and various hardware to couple the axle assembly 450 to the encoder 402.

The aforementioned system components (e.g., encoder 402, image capture module 428, and axle assembly 450, etc.) can be communicably coupled to each other via electrical cables, such that data can be transmitted. The system 400 can be configured to provide communication via the various systems, components, and modules disclosed herein via an application programming interface (API), peripheral component interface (PCI), PCI-Express, American National Standards Institute (ANSI)-X12, Ethernet, Wi-Fi, Bluetooth, or other suitable communication protocol or medium. Additionally, third party systems and databases can be operably coupled to the system components via a network.

The data transmitted to and from the components of system 400 (e.g., the encoder 402, image capture module 428, and axle assembly 450), can include any format, including JavaScript Object Notation (JSON), transfer control protocol (TCP)/internet protocol (IP), extensible markup language (XML), hypertext markup language (HTML), American Standard Code for Information Interchange (ASCII), short message service (SMS), comma-separated value (CSV), representational state transfer (REST), a custom designed data formatted for the particular application, or other suitable format. The data transmission can include a message, flag, header, header properties, metadata, and/or a body, or be encapsulated and packetized by any suitable format having same.

The encoder 402 can be implemented in hardware, firmware, software, or a suitable combination of hardware, firmware, and software therefor, and can comprise one or more software systems operating on one or more servers, having one or more processor(s) 404, with access to memory 430. The encoder 402 can include a rotary encoder (e.g., vehicle encoder 120 from FIG. 1), electronic storage, one or more processors, and/or other components. The encoder 402 can include communication lines, connections, and/or ports to enable the exchange of information via a network and/or other computing platforms. The encoder 402 can also include a plurality of hardware, software, and/or firmware components operating together to provide the functionality attributed herein to the encoder. Additionally, the encoder 402 can include memory 430.

The memory 430 can comprise electronic storage that can include non-transitory storage media that electronically stores information. In an embodiment, the memory 430 can store timeframe metadata and signal samples corresponding to an electrical signal from the encoder 402. The electronic storage media of electronic storage can include one or both of system storage that can be provided integrally (e.g., substantially non-removable) with the encoder 402 and/or removable storage that can be removably connectable to the encoder 402 via, for example, a port (e.g., a Universal Serial Bus (USB) port, a firewire port, etc.) or a drive (e.g., a disk drive, etc.). Electronic storage can include one or more of optically readable storage media (e.g., optical disks, etc.), magnetically readable storage media (e.g., magnetic tape, magnetic hard drive, floppy drive, etc.), electrical charge-based storage media (e.g., erasable electronic programmable read only memory (EEPROM), random access memory (RAM), etc.), solid-state storage media (e.g., flash drive, etc.), and/or other electronically readable storage media. Electronic storage can include one or more virtual storage resources (e.g., cloud storage, a virtual private network, and/or other virtual storage resources). The electronic storage can include a database, or public or private distributed ledger (e.g., blockchain). Electronic storage can store machine-readable instructions 406, software algorithms, control logic, data generated by processor(s), data received from server(s), data received from computing platform(s), and/or other data that can enable server(s) to function as described herein. The electronic storage can also include third-party databases accessible via a network.

The processor(s) 404 can be configured to provide data processing capabilities in the encoder 402. In an embodiment, the processor(s) 404 can be used to generate a trigger signal to execute the image capture module 428. As such, the processor(s) 404 can include one or more of a digital processor, an analog processor, a digital circuit designed to process information, an analog circuit designed to process information, a state machine, and/or other mechanisms for electronically processing information, such as an ARDUINO® microcontroller, field programmable gate arrays (FPGAs) or application specific integrated circuits (ASICs). The processor(s) 404 can be a single entity or include a plurality of processing units. These processing units can be physically located within the same device, or processor(s) 404 can represent processing functionality of a plurality of devices or software functionality operating alone, or in concert. A networked computer processor can be a processor(s) 404 operably coupled to a network. The networked computer processor can be operably coupled to other processors, databases, or components.

The processor(s) 404 can be configured to execute machine-readable instructions 406 or machine learning modules via software, hardware, firmware, some combination of software, hardware, and/or firmware, and/or other mechanisms for configuring processing capabilities on processor(s) 404. As used herein, the term "machine-readable instructions" can refer to any component or set of components that perform the functionality attributed to the machine-readable instructions component 406. This can include one or more physical processor(s) 404 during execution of processor-readable instructions, the processor-readable instructions, circuitry, hardware, storage media, or any other components.

The encoder 402 can be configured with machine-readable instructions having one or more functional modules. The machine-readable instructions 406 can be implemented on the encoder 402, having one or more processor(s) 404, with access to memory 430. The machine-readable instructions 406 can be a single networked node, or a machine cluster, which can include a distributed architecture of a plurality of networked nodes. The machine-readable instructions 406 can include control logic for implementing various functionality, as described in more detail below. The machine-readable instructions 106 can include certain functionality associated with the system 400.

Figure 5:
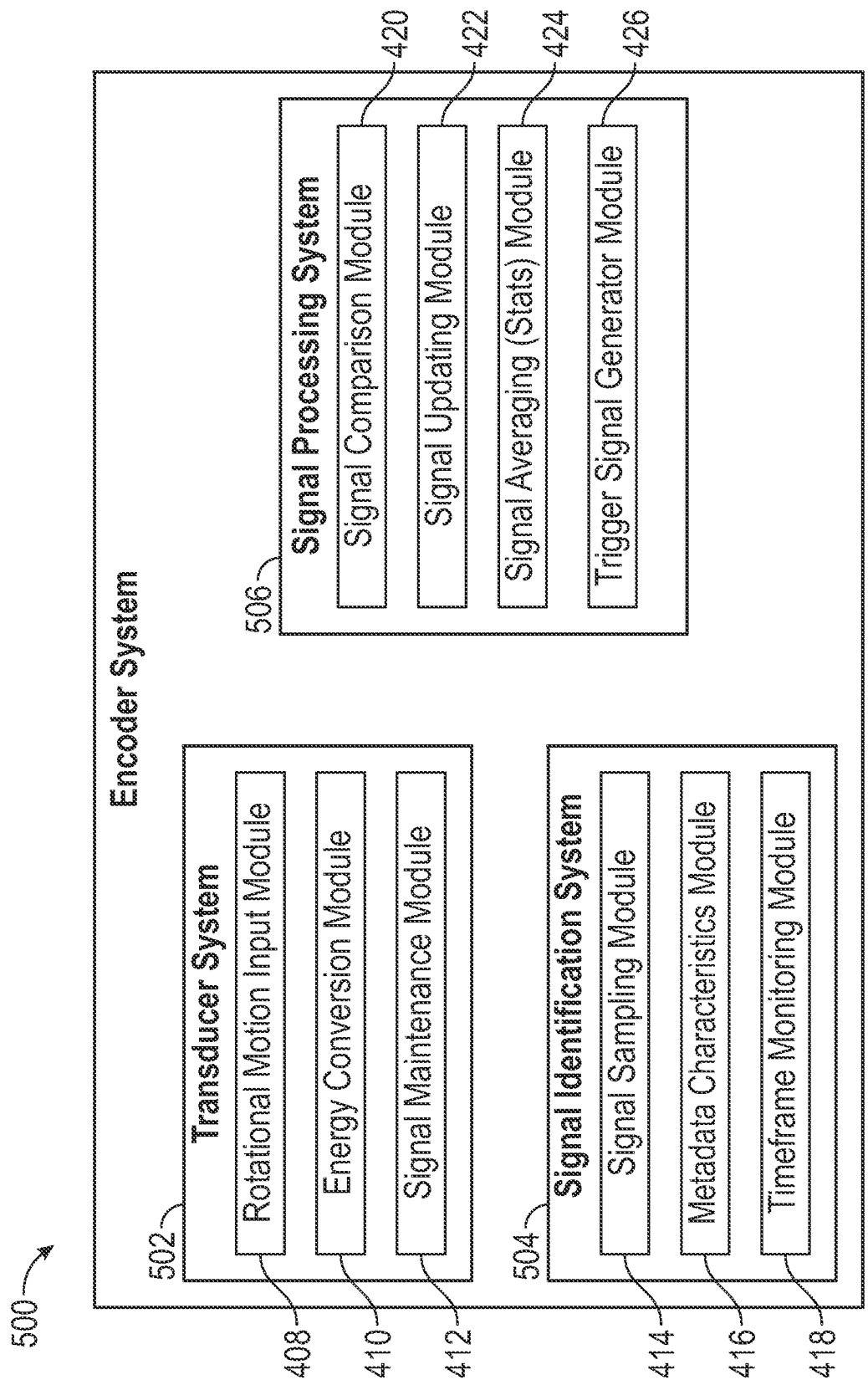
FIG. 5 illustrates an example encoder system, in accordance with one or more embodiments of the present disclosure.

FIG. 5 illustrates a schematic view of an encoder system 500, in accordance with one or more embodiments of the present disclosure. The encoder system 500 can include a transducer system 502, signal identification system 504, and signal processing system 506. Although certain embodiments can be directed to triggering a high-resolution camera array (e.g., an image capture module 428 in FIG. 4) to capture a high-resolution image, the encoder system 500 can be used to trigger any sort of system relying on an encoder (e.g., encoder 402, vehicle encoder 120, etc.) for various types of events and systems such as locomotive maintenance monitoring, location tracking for vehicles, and autonomous vehicle applications.

In one embodiment, the transducer system 502 can include the rotational motion input module 408, the energy conversion module 410, and the signal maintenance module 412. The rotational motion input module 408, the energy conversion module 410, and the signal maintenance module 412 can implement one or more algorithms to facilitate energy conversion, including system monitoring, signal maintenance, and calibration algorithms. The algorithms and their associated thresholds and/or signatures can be programmable to suit a particular railroad events, application, function, facility, or other requirement. The transducer system 502 can be configured to transform rotational mechanical energy into electrical energy using an electromechanical transducer, such as a rotary torque transducer. In another embodiment, the transducer system 502 can generate an electrical signal including a plurality of square waves corresponding to the rotational mechanical energy. The elements can provide additional information related to the status of the axle assembly 450, or general maintenance of the locomotive. For example, notifications can be generated by the transducer system 502 and assigned priority values to indicate urgency of system status and error handling, or other suitable information.

The rotational motion input module 408 can receive mechanical motion as an input. For example, the rotational motion input module 408 can interface with a mechanical component, such as an encoder shaft or a mechanical coupler for an axle of a vehicle and receive the mechanical motion of the axle from the mechanical coupler as an input. The mechanical motion can correspond to a rotation of the axle of the vehicle (e.g., the axle assembly 450), oscillatory mechanical motion, or another type of mechanical motion. In another embodiment, the vehicle can include a locomotive, aircraft, marine vehicle, or any other vehicle. The rotational motion input module 408 can be operably coupled to an end of the mechanical coupler (e.g., the mechanical coupler assembly 604 of FIG. 6) coupled to the axle.

The energy conversion module 410 can convert the mechanical motion into an electrical signal. For example, the energy conversion module 410 can include an interface to the encoder shaft or the mechanical coupler to convert the mechanical motion into electrical energy and converting the electrical energy into the electrical signal. For example, the hardware can include a rotary transducer, rotary position sensor, potentiometer, hall effect sensor, or another type of transducer. In one embodiment, the electrical signal can include a high signal value corresponding to peaks of the electrical signal in response to a first half rotation of the axle. Alternatively, the electrical signal can include a low signal value corresponding to troughs of the electrical signal in response to a second half rotation of the axle.

The signal maintenance module 412 can ensure the electrical signal is within any signal constraints. For example, the signal maintenance module 412 can attenuate the electrical signal when the signal power of the electrical signal breaches a voltage amplitude threshold. If the electrical signal were unconstrained, the transducer system 502 could result in sporadic power surges and potentially destroy electrical components of the encoder system 500. In another embodiment, the signal maintenance module 412 can transmit the electrical signal to another system of the encoder system 500. For example, the signal maintenance module 412 can transmit the electrical signal to the signal identification system 504 for further analysis.

In one embodiment, the signal identification system 504 can include the signal sampling module 414, metadata characteristics module 416, and timeframe monitoring module 418. The signal sampling module 414, metadata characteristics module 416, and timeframe monitoring module 418 can implement one or more algorithms to facilitate signal analysis, including a signal identification, monitoring, and timing algorithms. The algorithms and their associated thresholds and/or signatures can be programmable to suit a particular railroad safety monitoring system, application, function, facility, or other requirement. The signal identification system 504 can be configured to transmit and receive electrical signals related to signal monitoring or other suitable activity, to and from the axle assembly 450 and/or transducer system 502. In another embodiment, the signal identification system 504 can generate one or more elements to flag for the signal processing system 506. The elements can provide additional information related to trigger signal generation. For example, metadata from the notification can indicate a square signal quality by the signal identification system 504.

The signal sampling module 414 can collect at least one sample from the electrical signal. For example, the signal sampling module 414 can collect the samples of the electrical signal across a current time frame in response to a rotation of an axle of a vehicle (e.g., the axle assembly 450). In one embodiment, for the signal sampling module 414 to collect one of the samples, the signal sampling module 414 can identify whether the electrical signal remains above a predetermined signal power threshold for a period of time to represent one of the samples. Further, the signal sampling module 414 can preserve the samples by filtering the electrical signals to further identify a more refined signal, to produce clear, defined samples for signal analysis. In one embodiment, when the electrical signal is below the predetermined threshold, the signal sampling module 414 leaves the electrical signal unsampled or sampled as a minimum value. The predetermined threshold can include a particular value of signal power to indicate the electrical signal can be identified by the signal sampling module 414.

The metadata characteristics module 416 can generate metadata of the samples including first values of the current timeframe. For example, the metadata characteristics module 416 can generate characteristics of signal values for each of the samples. For example, the metadata can include a total number of samples collected over the current time frame, a highest measured voltage of the samples, a highest measured current of the samples, an average of the measured voltage or current across the current time frame, a number of signal peaks of the electrical signal, a frequency of the electrical signal, an encoder rate, a rotation of the axle, or a transform of the electrical signal, or any other characteristic of the electrical signal important to analyzing the electrical signal across the current time frame.

The timeframe monitoring module 418 can monitor at least one timeframe for collecting information about the electrical signal. For example, the timeframe monitoring module 418 can monitor the timeframe based on user defined time constraints. The user defined time constraints can include granularity from seconds, milliseconds, microseconds, or another relevant time frame analysis value. The signal elements to analyze can include the electrical signal, the samples, the metadata, or relevant characteristics of the signals. For example, the timeframe monitoring module 418 can monitor the samples to identify whether to flag a particular sample as including an erroneous pulse. In another embodiment, the timeframe monitoring module 418, or another module or system of the encoder system 500, can transmit the samples, the metadata, or the electrical signal, to any other system of the encoder system 500. For example, the signal identification system 504 can transmit the samples to the signal processing system 506.

In one embodiment, the signal processing system 506 can include the signal comparison module 420, signal updating module 422, signal modification module 424, and trigger signal generator module 426. The signal comparison module 420, signal updating module 422, signal modification module 424, and trigger signal generator module 426 can implement one or more algorithms to facilitate signal analysis and statistical averaging of signals, including a signal comparison, signal updating, signal modification, and trigger signal generator algorithm. The algorithms and their associated thresholds and/or signatures can be programmable to suit a particular railroad safety monitoring system, application, function, facility, or other requirement. The signal processing system 506 can be configured to transmit trigger signals to an image capture module. In another embodiment, the signal processing system 506 can smooth out any erroneous pulses resulting in artifacts included within an image from the image capture module. For example, a notification can be generated by the signal processing system 506 and transmitted to the image capture module indicating an erroneous pulse was detected, a system error has occurred, or other suitable information.

In one embodiment, the signal comparison module 420, when an erroneous pulse is present based on the electrical signal, samples, or metadata, can compare signal values of the current timeframe with signal values of a previous timeframe. For example, the signal values can include a voltage, amplitude, and/or frequency of the electrical signals, square wave signals, or another signal. The signal values can include spurious signal values, such as spikes in voltage, amplitude, or frequency inconsistent with the motion of the vehicle. The encoder system 500 can rely on the motion of the vehicle to determine when to instruct the image capture module to capture an image. However, when the signal values are inconsistent with the motion of the vehicle, the images can include distortions and pixel inconsistencies, which results in improper safety monitoring. The comparison between the timeframes can be in response to the image capture module capturing the distorted image, or in anticipation of the distorted image.

In another embodiment, the signal comparison module 420 can compare the electrical signal with the erroneous pulse based on image distortion from an artifact found in the image captured by the image capture module. Alternatively, the signal comparison module 420 can anticipate image distortion based on the presence of the erroneous pulse in the current timeframe and flag the encoder system 500 to update the samples and the metadata prior to instructing the image capture module to capture an image. If the images include multiple pixel inconsistencies (i.e., pixels being distorted), potions of the image will be missing, stretched, or some other distorted manner. As a result, the safety monitoring of the image capture module can improperly analyze the images from the image capture module resulting in unsafe railway monitoring. The erroneous pulses can occur in response to lost or unnecessary motion from the axle of the locomotive. For example, the lost or unnecessary motion can include torsional rigidity, torsional stiffness, or slack. The lost or unnecessary motion from the axle can include multiple degrees of rotation unaccounted for based on poor coupling between the axle and the encoder. The mechanical coupler can be used to minimize the lost or unnecessary motion, but cannot entirely remove the lost or unnecessary motion, resulting in reduced erroneous pulses. The signal comparison module 420 can identify when the erroneous pulses are present in the received signals from the other systems of the encoder system 500.

The signal updating module 422, when the signal values of the current timeframe are different from the signal values of the previous timeframe, update the samples and metadata of the current timeframe. For example, the signal updating module 422 can update the signal values of the current timeframe when the erroneous pulses are present in the current timeframe. The averaged signal values can include a statistical analysis of the square wave signals. For example, the signal updating module 422 can calculate statistics for the signal values across a historic timeframe to generate the averaged signal values. In another embodiment, the signal updating module 422 can generate averaged signal values for the current timeframe in response to the signal values of the current timeframe being different than the signal values of the previous timeframe. In another embodiment, the statistics for the signal values can include the average, mean, median, or another statistical feature to determine a best fit to compensate for any artifacts. In another embodiment, the averaged signal vales can include the signal values of the previous timeframe.

The signal modification module 424 can assign the signal values of the previous timeframe as the signal values of the current timeframe. For example, when the signal updating module 422 generates the averaged signal values, the signal modification module 424 can update the signal values of the current time frame with the averaged signals. In one embodiment, the averaged signals can include the signal values of the previous timeframe to smooth the signal values of the current timeframe.

The trigger signal generator module 426 can generate a trigger signal. For example, the trigger signal generator module 426 can generate the trigger signal based on the electrical signal, signal values, samples, or metadata. In one embodiment, the trigger signal generator module 426 can generate the trigger signal from the samples, where a high value of the samples can indicate a high of the trigger signal. The high of the trigger signal can execute the image capture module to capture an image. The trigger signal can correspond to a smoothed signal in response to the averaged signals. For example, the smoothed signal can be a continuous signal without any erroneous pulses leading to optimum image captures. Alternatively, the trigger signal can include erroneous pulses due to the lost or unnecessary motion of the axle, resulting in a non-continuous signal executing the image capture module and capturing distorted images inconsistent with the motion of the vehicle. The averaged signals can result in the continuous signal and optimum image capture process.

Figure 6:
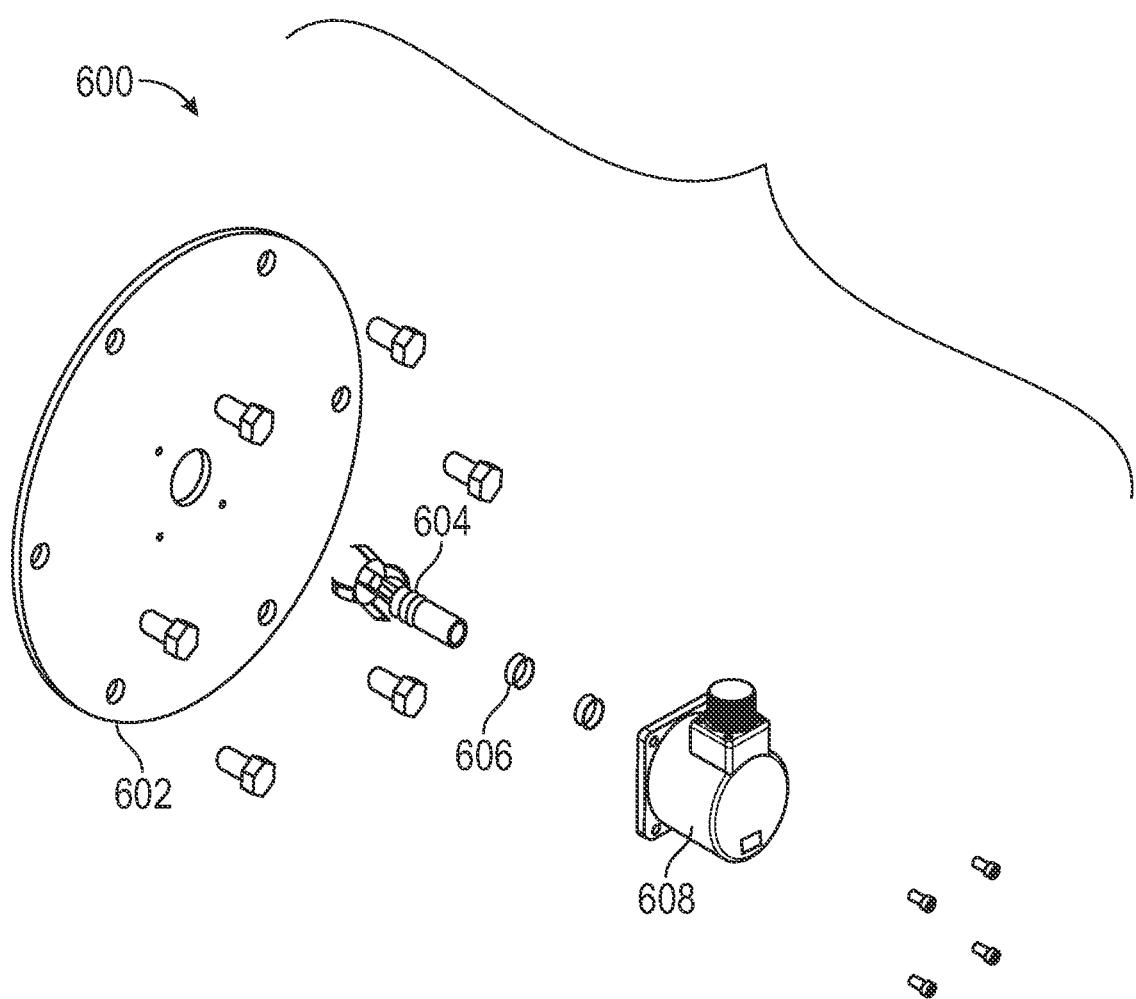
FIG. 6 illustrates an example block diagram of an encoder trigger system, in accordance with one or more embodiments of the present disclosure.

FIG. 6 illustrates a block diagram of an encoder trigger system 600, in accordance with one or more embodiments of the present disclosure. In an embodiment, the encoder trigger system 600 can include the axle assembly 450 of FIG. 4. The trigger system 600 can include an adapter plate 602, a mechanical coupler 604, a cable tie 606, and an encoder 608.

The adapter plate 602, in an embodiment, can operably couple two mechanical components to one another. For example, the adapter plate 602 can couple the mechanical coupler assembly 604 to an axle of a vehicle (not shown). The adapter plate 602 can fasten the mechanical coupler assembly 604 to the axle of the vehicle using a plurality of bolts.

The mechanical coupler assembly 604, in an embodiment, can operably couple the axle to the encoder 608. For example, the mechanical coupler assembly 604 can couple the axle of the locomotive to the encoder 608 to minimize lost or unnecessary motion of the axle. In one embodiment, the mechanical coupler assembly 604 can minimize the lost or unnecessary motion by coupling a mechanical component into the splines of the axle by applying tension from the mechanical component to the walls of the splined hole in the axle to ensure rotation of 604 and the shaft of the encoder 608 when the axle rotates. The body of encoder 608 can be affixed to 602 by way of threaded fasteners or other suitable attachment. The mechanical coupler assembly 604 can be affixed to the shaft of encoder 608, and the mechanical coupler assembly 604 can rotate at the rate of the vehicle axle. The mechanical coupler 702, a subcomponent of 604, can engage the axle's splines, thereby ensuring rotation in synchronization with the axle. Thus, the tension from the mechanical component can minimize the lost motion, thereby ensuring accurate rotation detection by the encoder 608. It is within the scope of the disclosure to have any component of the mechanical coupler assembly 604 rotate such that the mechanical coupler assembly 604 can operably couple the axle to the encoder 608. Regardless, the relative motion between the encoder shaft and the encoder body generates the signal.

The cable tie 606, in an embodiment, can secure the components of the mechanical coupler assembly 604 in place. For example, the cable tie 606 can provide circumferential pressure around the components of the mechanical coupler assembly 604 to minimize unwanted movement by the mechanical coupler assembly 604 for the encoder 608.

The encoder 608, in an embodiment, can generate an electrical signal based on rotational motion of the axle, adapter plate 602, and mechanical coupler assembly 604. For example, the encoder 608 can include components to convert the rotational motion into the electrical signal. The encoder 608 can include an encoder rate programmed or default. For example, the encoder rate can be programmed into the encoder 608 as an integer value, such as programmed to 1715 or 1716 pulses per revolution. Alternatively, the encoder rate can be default as set from a manufacturer of the encoder 608. In another embodiment, the encoder rate can be determined as discussed in the description for FIG. 3. In another embodiment, the encoder 608 can include a rotary encoder (e.g., encoder 402, vehicle encoder 120, etc.).

Figure 7:
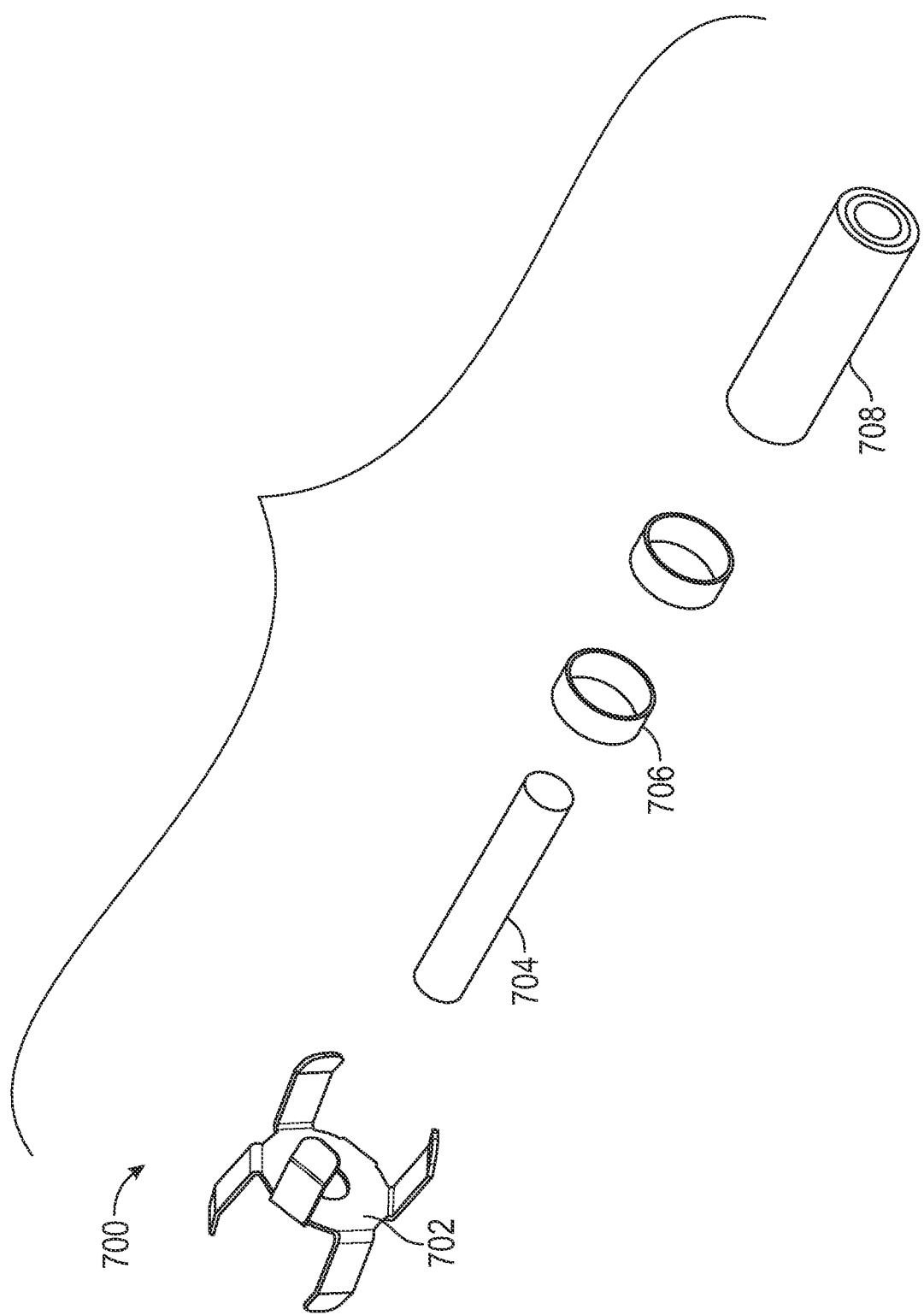
FIG. 7 illustrates an example block diagram of a mechanical coupler assembly, in accordance with one or more embodiments of the present disclosure.

FIG. 7 illustrates a block diagram of a mechanical coupler assembly 700, in accordance with one or more embodiments of the present disclosure. In an embodiment, the mechanical coupler assembly 700 can include the mechanical coupler assembly 604 and the cable tie 606 of FIG. 6. The mechanical coupler assembly 700 can include a mechanical coupler 702, an encoder shaft 704, a cable tie 706, and a flexible shaft 708. The flexible shaft 708 can be a hose, cable, or other suitable component.

In one embodiment, the mechanical coupler 702 can include a flexible coupler to engage an encoder to an axle of a vehicle. For example, on the inside of the axle can include a standard spline for engaging a decelostat, e.g., a standard SAE spline. In another embodiment, female splines can be disposed on the end of the axle and male spline couplings can engage the female splines. The decelostat can prevent over-braking causing wheel-slide in the vehicle, a condition of a reduction in friction between wheels and a railway. In another embodiment, the standard spline can include a female end such that the mechanical coupler 702 can include a male end to engage the axle. In another embodiment, the mechanical coupler 702 can minimize any lost or unnecessary motion of rotation from the axle by engaging the axle with a plurality of tabs all contacting the axle and/or the encoder shaft 704 to ensure sensitive reaction to the axle rotation. For example, the mechanical coupler 702 can include the plurality of tabs, such that a subset of the tabs are bent towards the axle and the remaining tabs are bent towards the encoder.

In one embodiment, the plurality of tabs can minimize the lost or unnecessary motion by providing force on the inner perimeter of the opening of an adapter plate. The force from the mechanical coupler 702 secures the mechanical coupler 702 in place while allowing the mechanical coupler 702 to rotate in a bounded manner with the axle rotation. In another embodiment, the adapter plate 602 does not rotate. Instead, the mechanical coupler 702 engages the splines of the axle. In one embodiment, plate 602 can be bolted to the axle bearing adapter. Plate 602, the axle, the axle bearing adapter, and the bearing itself can all be coaxially oriented. Plate 602 can provide a fixed position for the encoder body, and the encoder shaft can rotate in sync with the axle. The relative motion between the encoder shaft and the encoder body generates the signal.

In another embodiment, the mechanical coupler 702 can include the plurality of tabs each bent at 80 degrees, or any other suitable angle to minimize the lost or unnecessary motion. In another embodiment, the tabs are spaced equidistant around the mechanical coupler 702. The equidistant spacing can ensure balanced force distribution along the mechanical coupler 702 to minimize lost or unnecessary motion. For example, the plurality of tabs can include six tabs and can be spaced approximately 60 degrees from one another. In another embodiment, each of the plurality of tabs can include a small tab proximate to the end of the respective tab. The small tab can ease attaching the mechanical coupler 702 to the axle. For example, the small tab on each of the plurality of tabs can be bent towards a central axis of the mechanical coupler 702 resulting in a structure for ease of insertion of the mechanical coupler 702 into the axle. In another embodiment, the small tab on each of the plurality of tabs can be bent 25 degrees off of the plurality of tabs. The lost or unnecessary motion of rotation can include torsional rigidity, torsional stiffness, or slack of the mechanical coupling between the axle and the mechanical coupler 702.

The encoder shaft 704, in an embodiment, can be coupled to an encoder (e.g., the encoder in FIG. 1, 4, or 6) and the mechanical coupler 702. For example, the encoder shaft 704 can rotate in response to the axle rotation causing the encoder to generate a trigger signal. In another embodiment, the encoder shaft 704 can include a rigid material, such as metal or plastic, depending on the application. The encoder shaft 704 can include a structure, such as a flattened side of the longitudinal shape of the encoder shaft 704 to provide torque to the encoder for the encoder to generate the trigger signal.

The cable tie 706, in an embodiment, can fasten the encoder shaft 704 to the flexible shaft 708. For example, the cable tie 706 can include a type of fastener for holding components together. In another embodiment, the cable tie 706 can be constructed from a flexible material such as nylon, tape, plastic, among other materials for the respective application.

The flexible shaft 708, in an embodiment, can protect the encoder shaft 704 from damage in response to typical use. For example, the flexible shaft 708 can include at least one layer of a material. In another embodiment, the material can include a padded material to protect the encoder shaft.

Figure 8A:
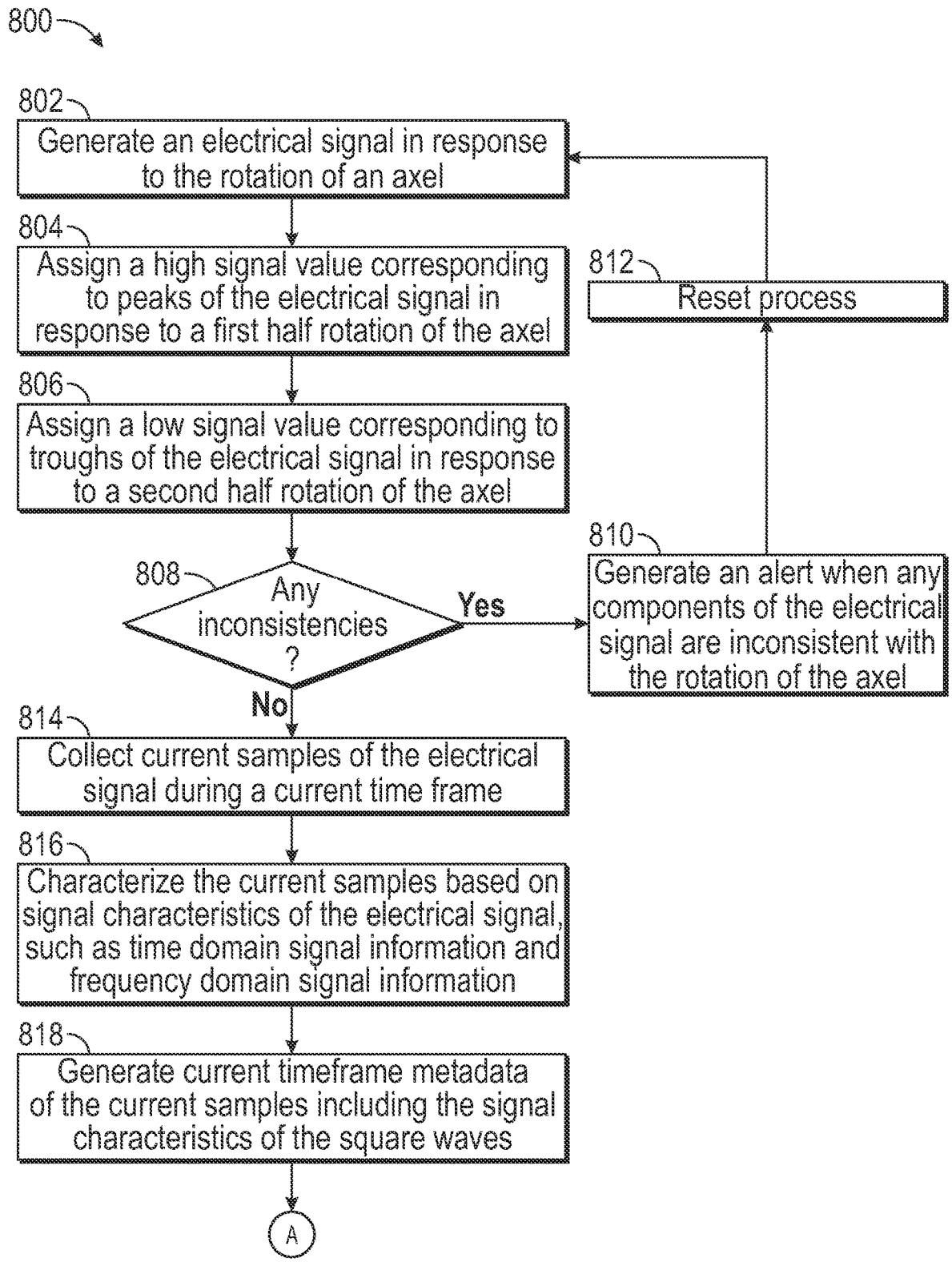
FIGS. 8A and 8B illustrate an example flowchart exemplifying trigger control logic, in accordance with one or more embodiments of the present disclosure.
Figure 8B:
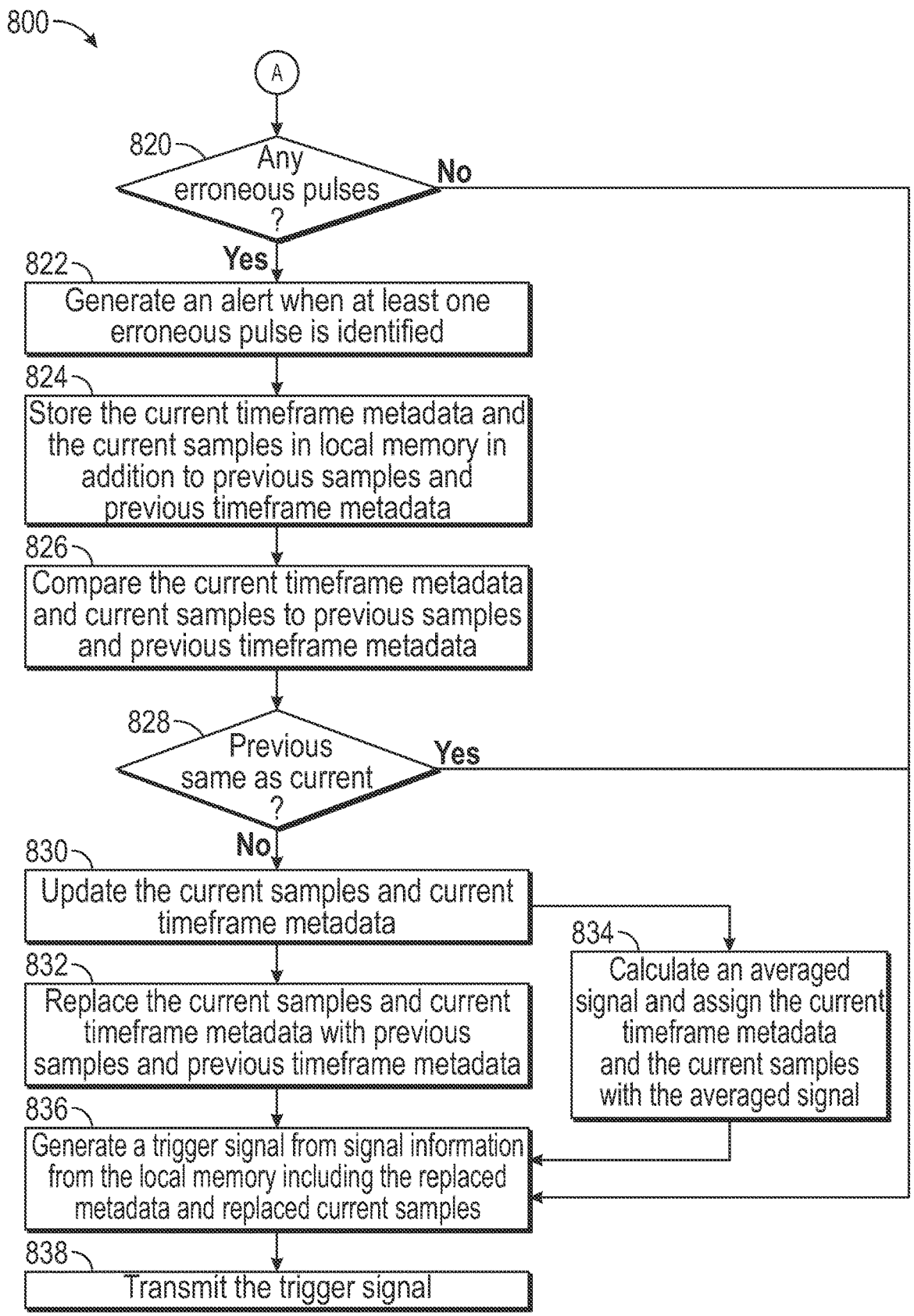

FIGS. 8A and 8B illustrate a flowchart exemplifying trigger control logic 800, in accordance with one or more embodiments of the present disclosure. The trigger control logic 800 can be implemented as an algorithm on an encoder 402, a machine learning module, a client, a database, or other suitable system. Additionally, the trigger control logic 800 can implement or incorporate one or more features of the encoder system 500, the transducer system 502, signal identification system 504, and signal processing system 506. The trigger control logic 800 can be achieved with software, firmware, hardware, an application programming interface (API), a network connection, a network transfer protocol, HTML, DHTML, JavaScript, Dojo, Ruby, Rails, other suitable applications, or a suitable combination thereof.

At step 802, in an embodiment, the control logic 800 can generate an electrical signal in response to a rotation of an axle. For example, the control logic 800 can convert the angular motion of the axle to output signals. In one embodiment, the electrical signal can include either an analog electrical signal or a digital electrical signal. In one embodiment, the control logic 800 can convert the angular motion of an encoder shaft (e.g., 704 of FIG. 7) into the electrical signal. The control logic 800 then proceeds to step 806.

At step 804, in an embodiment, the control logic 800 can assign a high signal value corresponding to peaks of the electrical signal in response to a first half rotation of the axle. For example, the control logic 800 can measure the encoder shaft movement across conductive brushes within an encoder (e.g., an encoder as in FIGS. 1, 4, 6, etc.) in response to the rotation of the encoder shaft. The control logic 800 can identify the encoder shaft completing the first half rotation when the control logic 800 measures a conductive difference between a start position of the encoder shaft and a position with a conductive minimum. The control logic 800 then proceeds to step 806.

At step 806, in an embodiment, the control logic 800 can assign a low signal value corresponding to troughs of the electrical signal in response to a second half rotation of the axle. For example, the control logic 800 can measure the encoder shaft movement across the conductive brushes within the encoder in response to the rotation of the encoder shaft. The control logic 800 can identify the encoder shaft completing the second half rotation when the control logic 800 measures a conductive difference between a position with a conductive minimum and returning to the start position. The control logic 800 then proceeds to step 808.

At step 808, in an embodiment, the control logic 800 can determine any inconsistencies between the electrical signal and the rotation of the axle. For example, the rotation of the axle can include lost or unnecessary motion due to improper fitting between the axle and the encoder shaft. In one embodiment, the axle can correspond with loose mechanical fitting resulting in the axle able to rotate without the encoder shaft rotating, which avoids resulting in any detection of rotation by the encoder. The control logic 800 can compare the electrical signal with a known rotation of the axle to determine whether an inconsistency exists between the electrical signal and the known rotation. For example, the control logic 800 can determine a total number of rotations by counting the number of high signals and the number of low signals and compare the total number of rotations with the known rotations to determine if any inconsistency exists. If the control logic 800 determines an inconsistency exists, the control logic 800 proceeds with step 810. If the control logic 800 determines no inconsistency, the control logic 800 proceeds with step 814.

At step 810, in an embodiment, the control logic 800 can generate an alert when any components of the electrical signal are inconsistent with the rotation of the axle. For example, the control logic 800 can generate an error signal to alert a user of the inconsistency. In one embodiment, the error signal can be a digital signal to display on a user interface, a light-emitting diode (LED), a firmware error code, among any other error signal methods applicable to an encoder. The control logic 800 then proceeds to step 812.

At step 812, in an embodiment, the control logic 800 can reset the process of generating a trigger signal. The control logic 800 then proceeds to step 802.

At step 814 in an embodiment, the control logic 800 can collect current samples of the electrical signal during a current timeframe. For example, the control logic 800 can collect measurements of the electrical signal across various times in the current timeframe as the samples. The current timeframe can correspond with a number of revolutions of the axle or an encoder rate. In one embodiment, the encoder rate can be a user-defined code or preprogrammed. The encoder rate can include a number of electrical pulses generated by the encoder in one revolution of the encoder shaft. The samples can include various characteristics about the electrical signal. For example, the samples can include a measure of voltage of the electrical signal at a given time, a measure of current of the electrical signal, or another type of signal characteristic relevant to the application. The control logic 800 then proceeds to step 816.

At step 816, in an embodiment, the control logic 800 can characterize the samples based on signal characteristics of the electrical signal, such as time domain signal information and frequency domain signal information. For example, the control logic 800 can compare the measured voltage of the electrical signal to a threshold value. When the voltage of the electrical signal is below the threshold, the control logic 800 can assign a flag value to the particular sample using various means, such as a numeric index of the sample in the current time frame. The control logic 800 then proceeds to step 818.

At step 818, in an embodiment, the control logic 800 can generate metadata of the samples including first signal values of the current timeframe. For example, the metadata can include a total number of samples collected over the current time frame, a highest measured voltage of the samples, a highest measured current of the samples, an average of the measured voltage or current across the current time frame, a number of signal peaks of the electrical signal, a frequency of the electrical signal, an encoder rate, a rotation of the axle, or a transform of the electrical signal, or any other characteristic of the electrical signal important to analyzing the electrical signal across the current time frame. In another embodiment, the first signal values can include a voltage, an amplitude, and a frequency of the electrical signal across the current time frame. The control logic 800 then proceeds to step 820.

At step 820, in an embodiment, the control logic 800 can identify whether erroneous pulses are present in the electrical signal. For example, when the samples include a particular set of samples below the threshold value, the control logic 800 can collect the metadata to determine whether the samples includes the erroneous pulses. In one embodiment, the erroneous pulses can correspond with the metadata of the electrical signal such as a time the samples were below the threshold, a frequency the samples were below the threshold, among other characteristics of the metadata indicating behavior of the samples are insufficient for the application. In another embodiment, the erroneous pulses are present when the electrical signal of the current time frame includes pulses out of sync with a rotation of the axle If at least one erroneous pulses are present, then the control logic 800 then proceeds to step 822. If no erroneous pulses are present, the control logic 800 then proceeds to step 836.

At step 822, in one embodiment, the control logic 800 can generate an alert when at least one erroneous pulse is identified. For example, the control logic 800 can generate an error signal to alert a user of the erroneous pulse. In one embodiment, the error signal can be a digital signal to display on a user interface, an LED, a firmware error code, among any other error signal methods applicable to an encoder. The control logic 800 proceeds to step 824.

At step 824, in an embodiment, the control logic 800 can store the metadata and samples in local memory. For example, the control logic 800 can store the metadata and samples of the current timeframe, and any previous samples and previous timeframe metadata. The control logic 800 proceeds to step 826.

At step 826 in an embodiment, the control logic 800 can compare the first signal values of the current timeframe with second signal values from metadata of at least one previous time frame. For example, the control logic 800 can store the second signal values for reference. In one embodiment, the time frame immediately before the current time frame can be used as the reference. In another embodiment, the control logic 800 can compare the metadata of the previous time frame with the metadata of the current time frame to determine whether the signal values are equivalent. For example, the control logic 800 can compare the first signal values with the second signal values to evaluate whether differences exist. The control logic 800 then proceeds to step 828.

At step 828, in an embodiment, the control logic 800 can identify whether the first signal values of the current timeframe are the same as the second signal values of the previous timeframe. If the signal values are the same, the control logic 800 then proceeds to step 818. If the signal values are not the same, the control logic 800 then proceeds to step 830.

At step 830, in an embodiment, the control logic 800 can update the samples and the metadata. If the control logic 800 is to replace the samples, the control logic 800 proceeds to step 832. If the control logic 800 is to calculate an averaged signal, the control logic 800 proceeds to step 834.

At step 832, in an embodiment, the control logic 800 can replace the first signal values of the current timeframe with the second signal values of the previous timeframe. For example, when an artifact is present in the current timeframe, the control logic 800 can assign the second signal values of the previous timeframe as the first signal values of the current timeframe. The control logic 800 can avoid the erroneous pulses by replacing the first signal values. By avoiding the erroneous pulses, the control logic 800 can generate a smoothed signal resulting in a sharp resolution from images captured by the image capture module. The control logic 800 then proceeds to step 836.

At step 834, in an embodiment, the control logic 800 can calculate an averaged signal for the current timeframe. For example, the control logic 800 can calculate the averaged signal based on at least the samples of the current time frame. In one embodiment, the control logic 800 can calculate the averaged signal based on historic signal values including averaged metadata and averaged samples. The historic signal values can include the averaged metadata and averaged samples the control logic 800 pre-calculated for reference. In another embodiment, the control logic 800, to smooth the signal values of the current timeframe, can replace the metadata with the averaged metadata and replace the samples with the averaged samples. In another embodiment, the control logic 800 can calculate the averaged signal using computational techniques such as calculating a moving average of historic signal values, a signal averaging technique, a moving mean of the historic samples, among other signal processing techniques. The moving average can be based on the historic samples weighted with each sample given less weighting further back in time. In another embodiment, the control logic 800 can calculate the moving average by generating a series of averages of different subsets of the full data set of the samples. In one embodiment, the smoothed signal can be based on the moving average signal calculation. The control logic 800 then proceeds to step 836.

At step 836, in an embodiment, the control logic 800 can generate a trigger signal. For example, the control logic 800 can generate the trigger signal based on the smoothed signal from removing the erroneous pulses. The trigger signal can include square waves from the control logic 800 monitoring a signal strength of the electrical signal across the current time frame and identifying one of the samples when the electrical signal is above a voltage threshold for a time frame. In another embodiment, the trigger signal can include the smoothed signal. As a result of the smoothed signal, the control logic 800 can remove distortion from images captured by the image capture module. In one embodiment, the smooth signal can remove distortions of two or more pixels from the images. In another embodiment, the control logic 800 can generate the trigger signal including the averaged signal. The control logic 800 then proceeds to step 838.

At step 838, in an embodiment, the control logic 800 can transmit the trigger signal to an image capture module. For example, the control logic 800 can transmit the trigger signal in the form of an electrical signal corresponding to the trigger signal. In one embodiment, the image capture module can include a high-resolution camera array for acquiring at least one high-resolution image. The control logic 800 can transmit the trigger signal using a physical electrical components, such as an electrical wire, optical cable, wireless communication signal, or some other means to transmit information.

Figure 9:
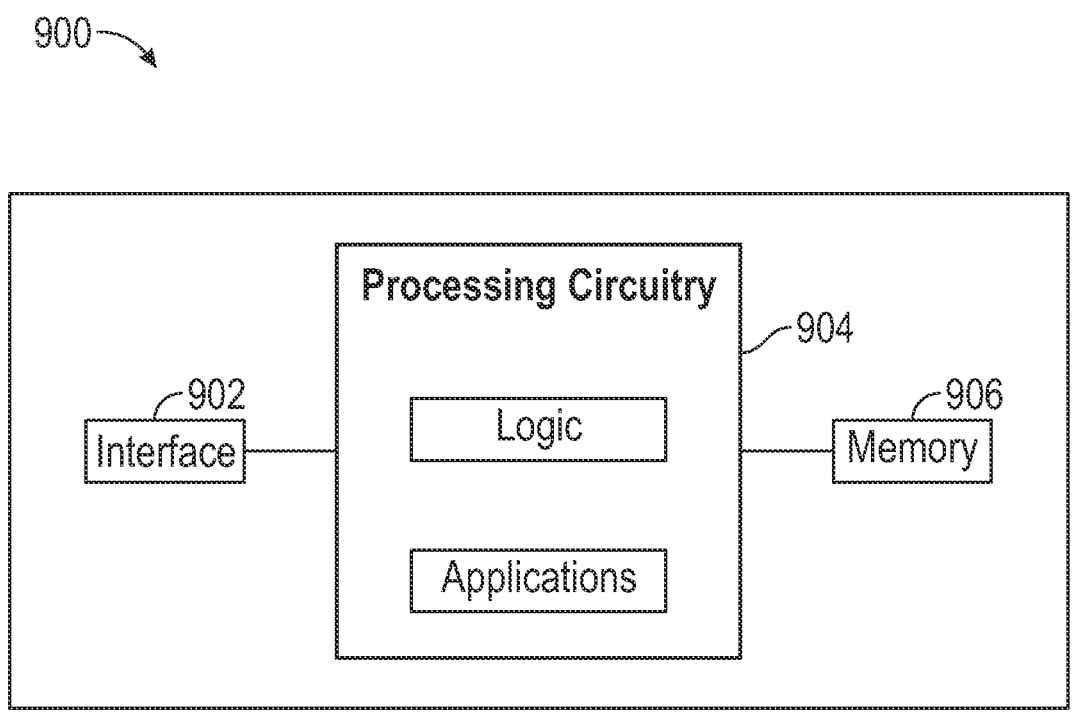
FIG. 9. Illustrates an example computer system that can be used by the systems and methods described herein.

FIG. 9 shows an example computer system that can be used by the systems and methods described herein. For example, one or more components (e.g., computer 150) of system 100 of FIG. 1 can include one or more interface(s) 902, processing circuitry 904, memory(ies) 906, and/or other suitable element(s). Interface 902 receives input, sends output, processes the input and/or output, and/or performs other suitable operation. Interface 902 can comprise hardware and/or software.

Processing circuitry 904 performs or manages the operations of the component. Processing circuitry 904 can include hardware and/or software. Examples of a processing circuitry include one or more computers, one or more microprocessors, one or more applications, etc. In certain embodiments, processing circuitry 904 executes logic (e.g., instructions) to perform actions (e.g., operations), such as generating output from input. The logic executed by processing circuitry 904 can be encoded in one or more tangible, non-transitory computer readable media (such as memory 906). For example, the logic can comprise a computer program, software, computer executable instructions, and/or instructions capable of being executed by a computer. In particular embodiments, the operations of the embodiments can be performed by one or more computer readable media storing, embodied with, and/or encoded with a computer program and/or having a stored and/or an encoded computer program.

Memory 906 (or memory unit) stores information. Memory 906 can comprise one or more non-transitory, tangible, computer-readable, and/or computer-executable storage media. Examples of memory 906 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Figure 10:
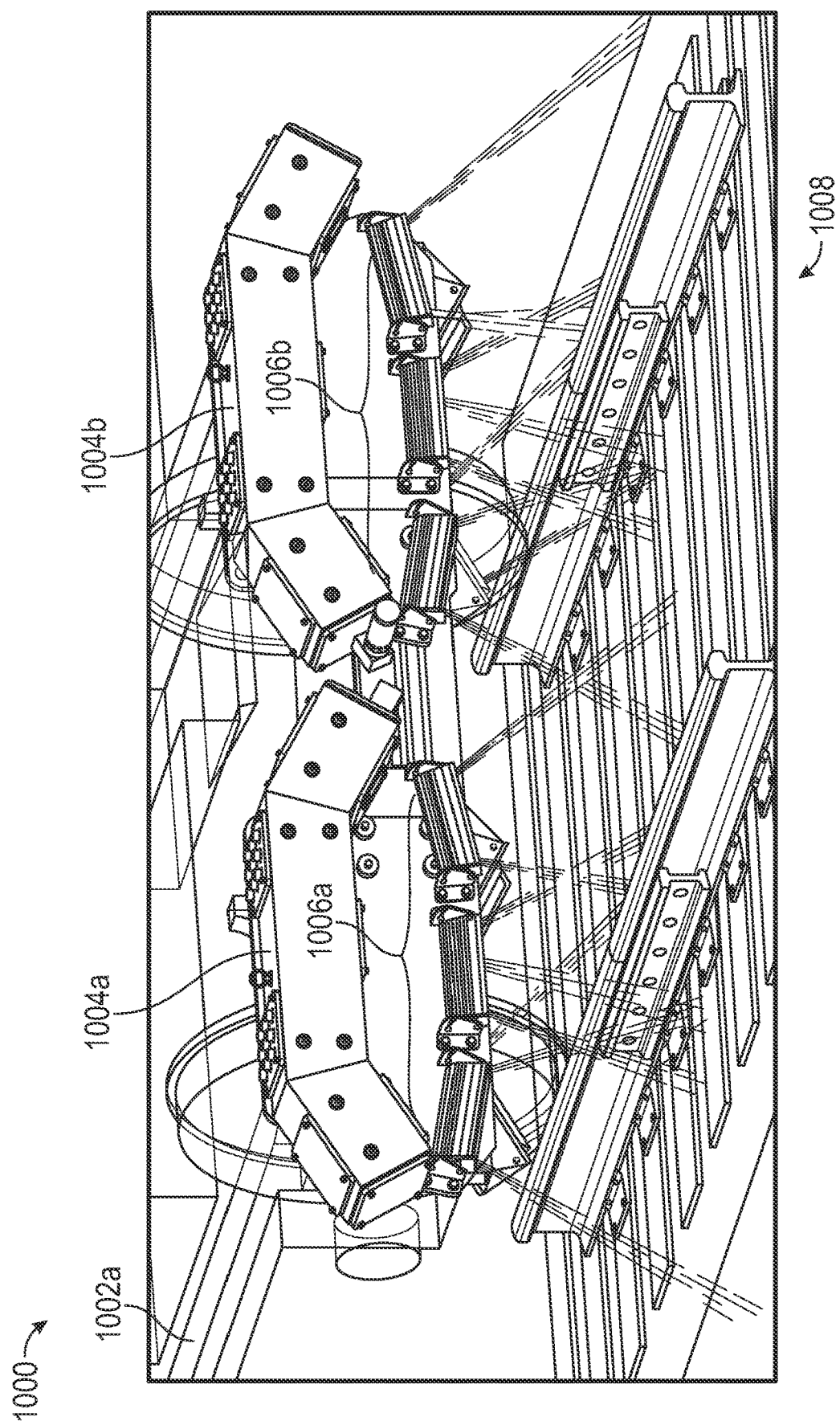
FIG. 10 illustrates an example system for field calibrating an image capturing module, in accordance with one or more embodiments of the present disclosure.

FIG. 10 illustrates an example system 1000 for field calibrating at least one image capturing module. The system 1000 or portions thereof can be associated with an entity, which can include any entity, such as a business, company (e.g., a railway company, a transportation company, etc.), or a government agency (e.g., a department of transportation, a department of public safety, etc.) that field calibrates the image capturing module. The elements of the system 1000 can be implemented using any suitable combination of hardware, firmware, and software. For example, the elements of the system 1000 can be implemented using one or more components of the computer system of FIG. 9.

The system 1000 includes a vehicle 1002, sub-beams 1004*a-b*, lighting arrays 1006*a-b*, and a roadway 1008.

The vehicle 1002 can include any machine capable of automated movement. Vehicle 1002 can be a car, a locomotive, a truck, a bus, an aircraft, or any other machine suitable for mobility. The vehicle 1002 can operate at any speed that allows one or more components (e.g., sensors, cameras, etc.) of sub-beams 1004*a-b* to capture images. For example, the vehicle 1002 can be a rail bound vehicle that travels at 65 miles per hour (mph).

The roadway 1008 can include any path that accommodates the vehicle 1002. For example, the vehicle 1002 can travel along the roadway 1008. The roadway 1008 can include a road, a highway, a railroad track, a water way, and the like.

The sub-beams 1004*a-b* can include a structure that contains and orients components (e.g., the image capturing modules) used to capture images. In certain embodiments, the sub-beams 1004*a-b* operate similar to a flatbed document scanner with the exception that the sub-beams 1004*a-b* are in motion while capturing images of stationary physical objects. The sub-beams 1004*a-b* can engage with the vehicle 1002. For example, the sub-beams 1004*a-b* can be bolted to a sub-frame attached to the vehicle 1002. In the illustrated embodiment of FIG. 10, the sub-beams 1004*a-b* have three sections that include two end sections and a center section. The sub-beams 1004*a-b* have a gullwing configuration such that the center section bends inward toward the center of the sub-beams 1004*a-b*. The gullwing configuration allows the image capturing components (e.g., sensors, cameras, etc.) of the image capturing modules within the sub-beams 1004*a-b* to be properly oriented within with respect to the physical objects being captured. In one or more embodiments, the center section of the sub-beams 1004*a-b* is omitted, and each end section can be coupled to vehicle 1002. The sub-beams 1004*a-b* can be made of metal (e.g., steel or aluminum), plastic, or any other material suitable for housing components of the sub-beams 1004*a-b* and for attaching the sub-beams 1004*a-b* to the vehicle 1002.

The sub-beams 1004*a-b* can include one or more openings. Openings can provide for the placement of the image capturing modules within the sub-beams 1004*a-b*. Openings can allow for installation, adjustment, and maintenance of the image capturing modules. While the sub-beams 1004*a-b* are illustrated in FIG. 10 as having a particular size and shape, the sub-beams 1004*a-b* can have any size and shape suitable to house and orient the image capturing modules 140. Other factors that can contribute to the design of the sub-beams 1004*a-b* include shock resistance, vibration resistance, weatherproofing considerations, durability, ease of maintenance, calibration considerations, and ease of installation.

In another embodiment, the sub-beams 1004*a-b* can include at least two sub-beams. For example, the sub-beams 1004*a-b* can include additional components, each including a plurality of cameras. In one embodiment, the system 1000 with the plurality of sub-beams can reduce complexity of maintenance and simplify construction of each of the sub-beams. In another embodiment, the system 1000 with the plurality of sub-beams can reduce complexity of maintenance by reducing a number of personnel needed resulting in the maintenance of control in construction tolerances. For example, the sub-beams 1004*a-b* can include 33% fewer welds and cuts to construct compared to a full beam. The sub-beams 1004*a-b* can provide minimized weight and length compared to a single full beam. For example, the sub-beams 1004*a-b* can include a weight less than the full beam. In one embodiment, each of the sub-beams 1004*a-b* can weigh 51 pounds. Additionally, the sub-beams 1004*a-b* can include a length less than the full beam. In one embodiment, each of the sub-beams 1004*a-b* can measure 53 inches in length. The sub-beams 1004*a-b* can provide an ability for two people to remove and install the sub-beams 1004a-b in the field without a lifting device. The sub-beams 1004a-b can maximize weld tolerances in parallel.

The lighting array 1004a-b, in an embodiment, can illuminate at least a portion of the roadway 1008. For example, the lighting array 1004a-b can include structural attachments such that the lighting array 1004a-b can attach to the sub-beams 1002a-b. In one embodiment, the lighting array 1004a-b can include a plurality of lighting elements. The plurality of lighting elements can be angled to fully illuminate the roadway. The lighting elements can include light-emitting diodes (LEDs), filament lamps, halogen bulbs, or any comparable lighting element to provide illumination.

Although FIG. 10 illustrates a particular arrangement of the vehicle 1002, the sub-beams 1004a-b, and the roadway 1008, this disclosure contemplates any suitable arrangement of the vehicle 1002, the sub-beams 1004a-b, and the roadway 1008. For example, the system 1000 can include a first beam at a front end of the vehicle 1002 and a second beam at a rear end of the vehicle 1002. One or more components of the system 1000 can be implemented using one or more components of the computer system of FIG. 9.

Figure 11:
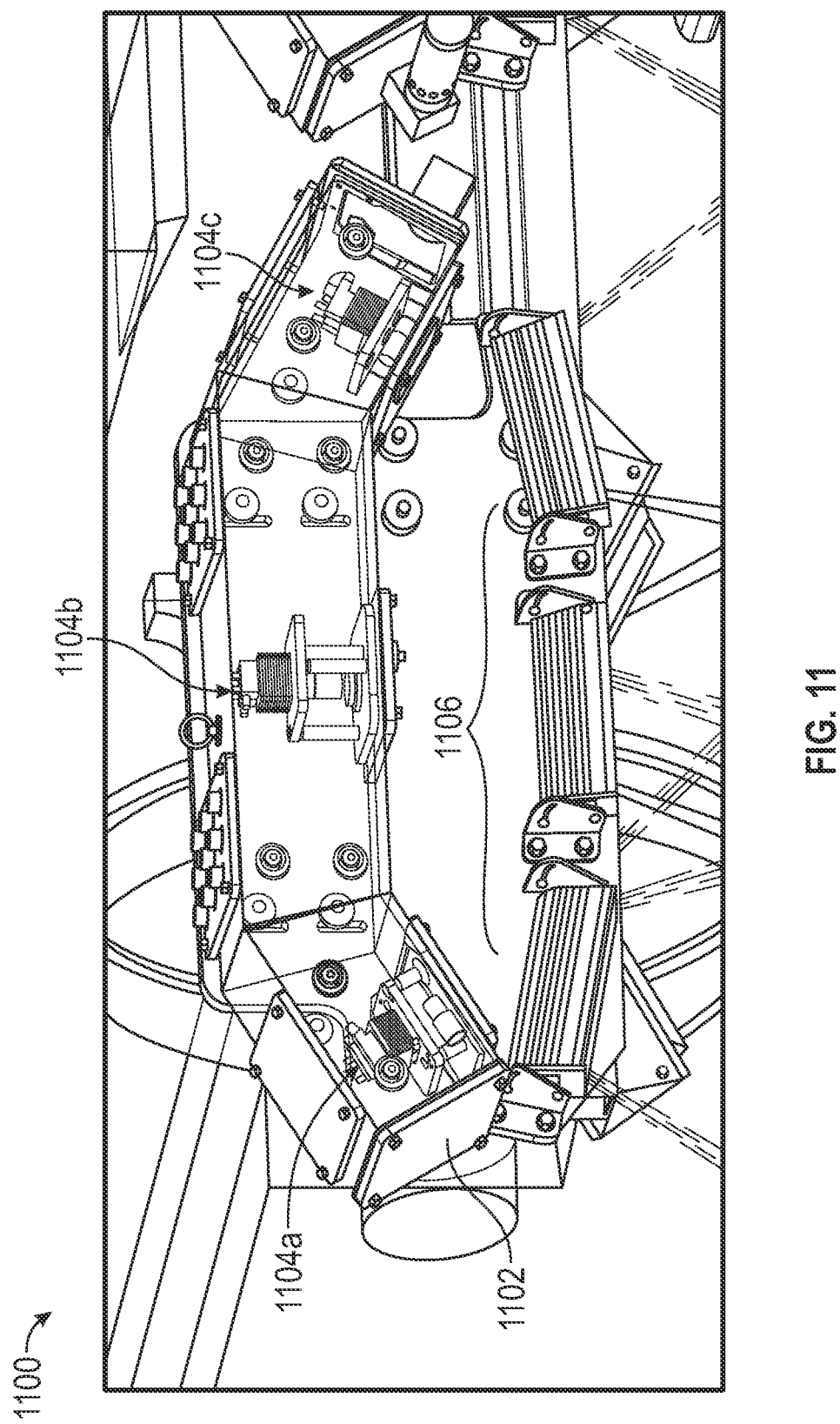
FIG. 11 illustrates an example system for field calibrating an image capturing module, in accordance with one or more embodiments of the present disclosure.

FIG. 11 illustrates an example system 1100 for field calibrating an image capturing module. The system 1100 or portions thereof can be associated with an entity, which can include any entity, such as a business, company (e.g., a railway company, a transportation company, etc.), or a government agency (e.g., a department of transportation, a department of public safety, etc.) that field calibrates image capturing module. The elements of the system 1100 can be implemented using any suitable combination of hardware, firmware, and software. For example, the elements of the system 1100 can be implemented using one or more components of the computer system of FIG. 9.

The system 1100 includes a beam 1102, one or more image capturing modules 1104a-c, and a lighting array 1006.

The beam 1102 can include a structure that contains and orients components (e.g., the image capturing modules 1104a-c) used to capture images. In one or more embodiments, the beam 1102 operates similar to a flatbed document scanner with the exception that the beam 1102 can be in motion while capturing images of stationary physical objects. The beam 1102 can engage with the vehicle. For example, the beam 1102 can be bolted to a sub-frame attached to the vehicle. In the illustrated embodiment of FIG. 11, the beam 1102 has three sections that include two end sections and a center section. The beam 1102 has a gullwing configuration such that the center section bends inward toward the center of the beam 1102. The gullwing configuration allows the image capturing components (e.g., sensors, cameras, etc.) of the image capturing modules 1104a-c within the beam 1102 to be properly oriented within with respect to the physical objects being captured. In certain embodiments, the center section of the beam 1102 can be omitted, and each end section can be coupled to a vehicle. The beam 1102 can be made of metal (e.g., steel or aluminum), plastic, or any other material suitable for housing components of the beam 1102 and for attaching the beam 1102 to the vehicle.

The beam 1102 can include one or more openings. Openings can provide for the placement of the image capturing modules 1104a-c within the beam 1102. Openings can allow for installation, adjustment, and maintenance of the image capturing modules 1104a-c. While the beam 1102 is illustrated in FIG. 11 as having a particular size and shape, the beam 1102 can have any size and shape suitable to house and orient the image capturing modules 1104a-c. Other factors that can contribute to the design of the beam 1102 include shock resistance, vibration resistance, weatherproofing considerations, durability, ease of maintenance, calibration considerations, and ease of installation.

In another embodiment, the beam 1102 can include a plurality of sub-beams. For example, the beam 1102 can include two separate sub-beams, each including a plurality of cameras. In one embodiment, the system 1100 with the plurality of sub-beams can reduce complexity of maintenance and simplify construction of each of the sub-beams. In another embodiment, the system 1100 with the plurality of sub-beams can reduce complexity of maintenance by reducing a number of personnel needed resulting in the maintenance of control in construction tolerances. For example, the sub-beams can include 33% fewer welds and cuts to construct compared to a full beam. The beam 1102 can provide minimized weight and length compared to a single full beam. For example, the beam 1102 can include a weight less than the full beam. In one embodiment, each of the beam 1102 can weigh 51 pounds. Additionally, the beam 1102 can include a length less than the full beam. In one embodiment, the beam 1102 can measure 53 inches in length. The beam 1102 can provide an ability for two people to remove and install the beam 1102 in the field without a lifting device. The beam 1102 can maximize weld tolerances in parallel.

The image capturing modules 1104a-c of system 1100 can be used to capture images while the vehicle is in motion. Each the image capturing module 1104a-c can include one or more sensors, one or more cameras, and the like. One or more the image capturing modules 1104a-c can be attached to the vehicle 110 at any location that allows the image capturing modules 1104a-c to capture images of the environment surrounding the vehicle. In the illustrated embodiment of FIG. 11, the image capturing modules 1104a-c are located within the beam 1102.

In certain embodiments, each end section of the beam 1102 houses one or more the image capturing modules 1104a-c. For example, a first end section of the beam 1102 can house the image capturing module 1104a that includes two downward facing cameras that capture images of tie and ballast areas of a rail. The first end section of the beam 1102 can house the two downward facing cameras in a portion of the first end section that can be substantially horizontal to the rail. The second end section of the beam 1102 opposite the first end section can house two of the image capturing modules 1104b-c that each include two angled cameras that capture images of both sides of the rail and rail fastening system. The second end section of the beam 1102 can house the four angled cameras in portions of the second end section that are at an angle (e.g., a 45 degree angle) to the rail.

The image capturing modules 1104a-c can include various types of sensors depending on sensing and/or measuring requirements. Sensors housed by the image capturing modules 1104a-c can include optical sensors (e.g., cameras for visible light (mono and color), infrared, UltraViolet, and/or thermal), motion sensors (e.g., gyroscopes and accelerometers), LIDAR sensors, hyperspectral sensors, GPS sensors, and the like. Optical sensors and lasers can be used together for laser triangulation to measure deflection or profile. LIDAR sensors can be used for generating 3D point-cloud data. Hyperspectral sensors can be used for specific wavelength responses. An example of the image capturing module 1104a-c is described in FIG. 2.

The lighting array 1106, in an embodiment, can illuminate at least a portion of the roadway. For example, the lighting array 1106 can include structural attachments such that the lighting array 1106 can attach to the beam 1102. In one embodiment, the lighting array 1106 can include a plurality of lighting elements. The plurality of lighting elements can be angled to fully illuminate the roadway. The lighting elements can include LEDs, filament lamps, halogen bulbs, or any comparable lighting element to provide illumination.

The image capturing module 1104*a-c* can be coupled to a memory and processor. The memory and processor can be configured to execute instructions to store the captured images and perform analysis (as described below in FIG. 13). Although FIG. 11 illustrates a particular arrangement of the beam 1102, the image capturing modules 1104*a-c*, and the lighting array 1106, this disclosure contemplates any suitable arrangement of the beam 1102, the image capturing modules 1104*a-c*, and the lighting array 1106. For example, the system 1100 can include a first beam at a front end of the vehicle and a second beam at a rear end of the vehicle. One or more components of the system 1100 can be implemented using one or more components of the computer system of FIG. 9.

Figure 12:
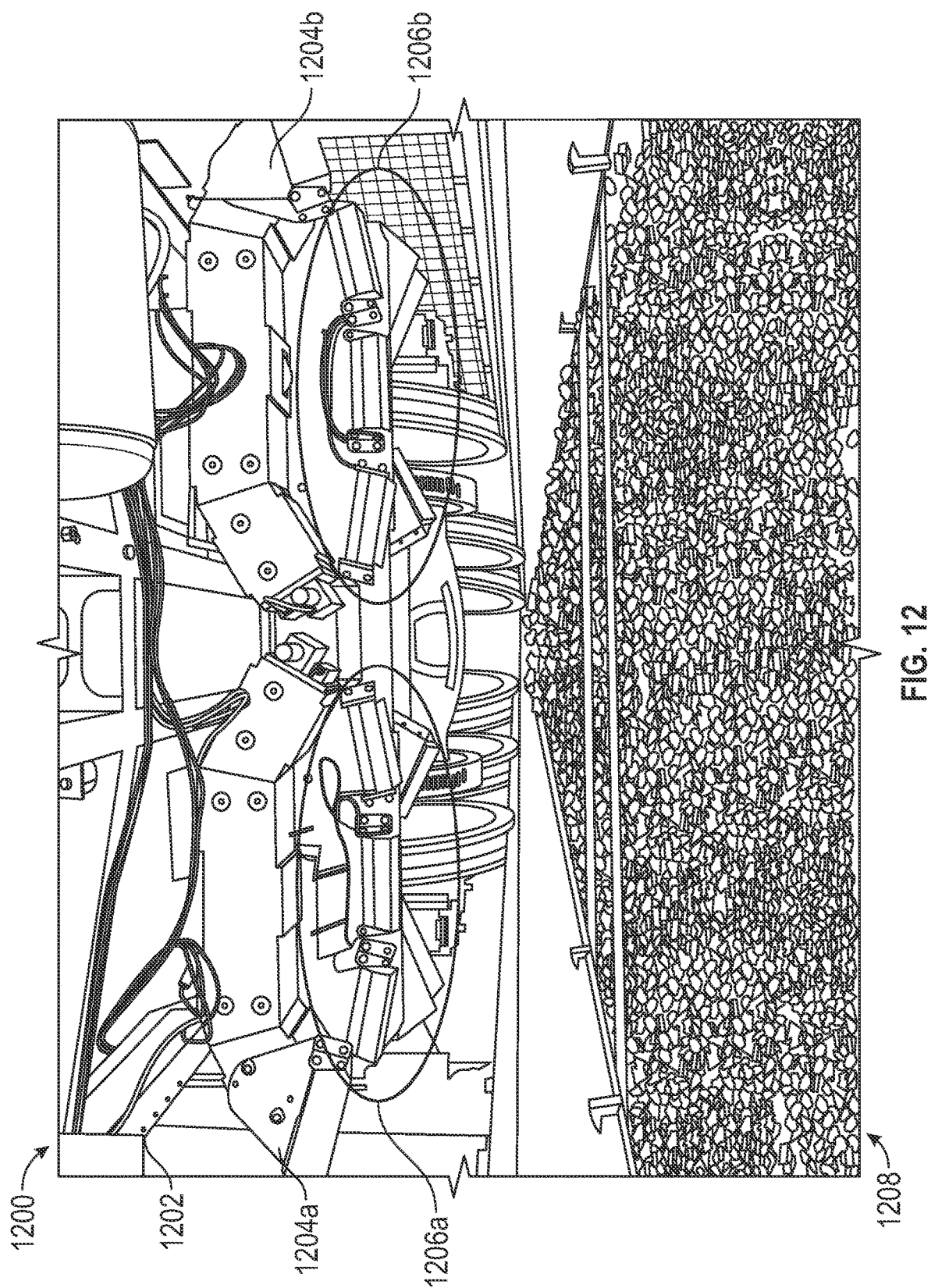
FIG. 12 illustrates an example system for field calibrating an image capturing module, in accordance with one or more embodiments of the present disclosure.

FIG. 12 illustrates an example system 1200 for field calibrating at least one image capturing module. The system 1200 or portions thereof can be associated with an entity, which can include any entity, such as a business, company (e.g., a railway company, a transportation company, etc.), or a government agency (e.g., a department of transportation, a department of public safety, etc.) that field calibrates the image capturing module. The elements of the system 1200 can be implemented using any suitable combination of hardware, firmware, and software. For example, the elements of the system 1200 can be implemented using one or more components of the computer system of FIG. 9.

The system 1200 includes a vehicle 1202, sub-beams 1204*a-b*, lighting arrays 1206*a-b*, and a roadway 1208.

The vehicle 1202 can include any machine capable of automated movement. Vehicle 1202 can be a car, a locomotive, a truck, a bus, an aircraft, or any other machine suitable for mobility. The vehicle 1202 can operate at any speed that allows one or more components (e.g., sensors, cameras, etc.) of sub-beams 1204*a-b* to capture images. For example, the vehicle 1202 can be a rail bound vehicle that travels at 65 miles per hour (mph).

The roadway 1208 can include any path that accommodates the vehicle 1202. For example, the vehicle 1202 can travel along the roadway 1208. The roadway 1208 can include a road, a highway, a railroad track, a water way, and the like.

The sub-beams 1204*a-b* can include a structure that contains and orients components (e.g., the image capturing modules) used to capture images. In certain embodiments, the sub-beams 1204*a-b* operate similar to a flatbed document scanner with the exception that the sub-beams 1204*a-b* are in motion while capturing images of stationary physical objects. The sub-beams 1204*a-b* can engage with the vehicle 1202. For example, the sub-beams 1204*a-b* can be bolted to a sub-frame attached to the vehicle 1202. In the illustrated embodiment of FIG. 12, the sub-beams 1204*a-b* have three sections that include two end sections and a center section. The sub-beams 1204*a-b* have a gullwing configuration such that the center section bends inward toward the center of the sub-beams 1204*a-b*. The gullwing configuration allows the image capturing components (e.g., sensors, cameras, etc.) of the image capturing modules within the sub-beams 1204*a-b* to be properly oriented within with respect to the physical objects being captured. In one or more embodiments, the center section of the sub-beams 1204*a-b* can be omitted, and each end section can be coupled to vehicle 1202. The sub-beams 1204*a-b* can be made of metal (e.g., steel or aluminum), plastic, or any other material suitable for housing components of the sub-beams 1204*a-b* and for attaching the sub-beams 1204*a-b* to the vehicle 1202.

The sub-beams 1204*a-b* can include one or more openings. Openings can provide for the placement of the image capturing modules within the sub-beams 1204*a-b*. Openings can allow for installation, adjustment, and maintenance of the image capturing modules. While the sub-beams 1204*a-b* are illustrated in FIG. 12 as having a particular size and shape, the sub-beams 1204*a-b* can have any size and shape suitable to house and orient the image capturing modules 140. Other factors that can contribute to the design of the sub-beams 1204*a-b* include shock resistance, vibration resistance, weatherproofing considerations, durability, ease of maintenance, calibration considerations, and ease of installation.

In another embodiment, the sub-beams 1204*a-b* can include at least two sub-beams. For example, the sub-beams 1204*a-b* can include additional components, each including a plurality of cameras. In one embodiment, the system 1200 with the plurality of sub-beams can reduce complexity of maintenance and simplify construction of each of the sub-beams. In another embodiment, the system 1200 with the plurality of sub-beams can reduce complexity of maintenance by reducing a number of personnel needed resulting in the maintenance of control in construction tolerances. For example, the sub-beams 1204*a-b* can include 33% fewer welds and cuts to construct compared to a full beam. The sub-beams 1204*a-b* can provide minimized weight and length compared to a single full beam. For example, the sub-beams 1204*a-b* can include a weight less than the full beam. In one embodiment, each of the sub-beams 1204*a-b* can weigh 51 pounds. Additionally, the sub-beams 1204*a-b* can include a length less than the full beam. In one embodiment, each of the sub-beams 1204*a-b* can measure 53 inches in length. The sub-beams 1204*a-b* can provide an ability for two people to remove and install the sub-beams 1204*a-b* in the field without a lifting device. The sub-beams 1204*a-b* can maximize weld tolerances in parallel.

The lighting array 1204*a-b*, in an embodiment, can illuminate at least a portion of the roadway 1208. For example, the lighting array 1204*a-b* can include structural attachments such that the lighting array 1204*a-b* can attach to the sub-beams 1202*a-b*. In one embodiment, the lighting array 1204*a-b* can include a plurality of lighting elements. The plurality of lighting elements can be angled to fully illuminate the roadway. The lighting elements can include LEDs, filament lamps, halogen bulbs, or any comparable lighting element to provide illumination.

Although FIG. 12 illustrates a particular arrangement of the vehicle 1202, the sub-beams 1204*a-b*, and the roadway 1208, this disclosure contemplates any suitable arrangement of the vehicle 1202, the sub-beams 1204*a-b*, and the roadway 1208. For example, the system 1200 can include a first beam at a front end of the vehicle 1202 and a second beam at a rear end of the vehicle 1202. One or more components of the system 1200 can be implemented using one or more components of the computer system of FIG. 9.

Figure 13:
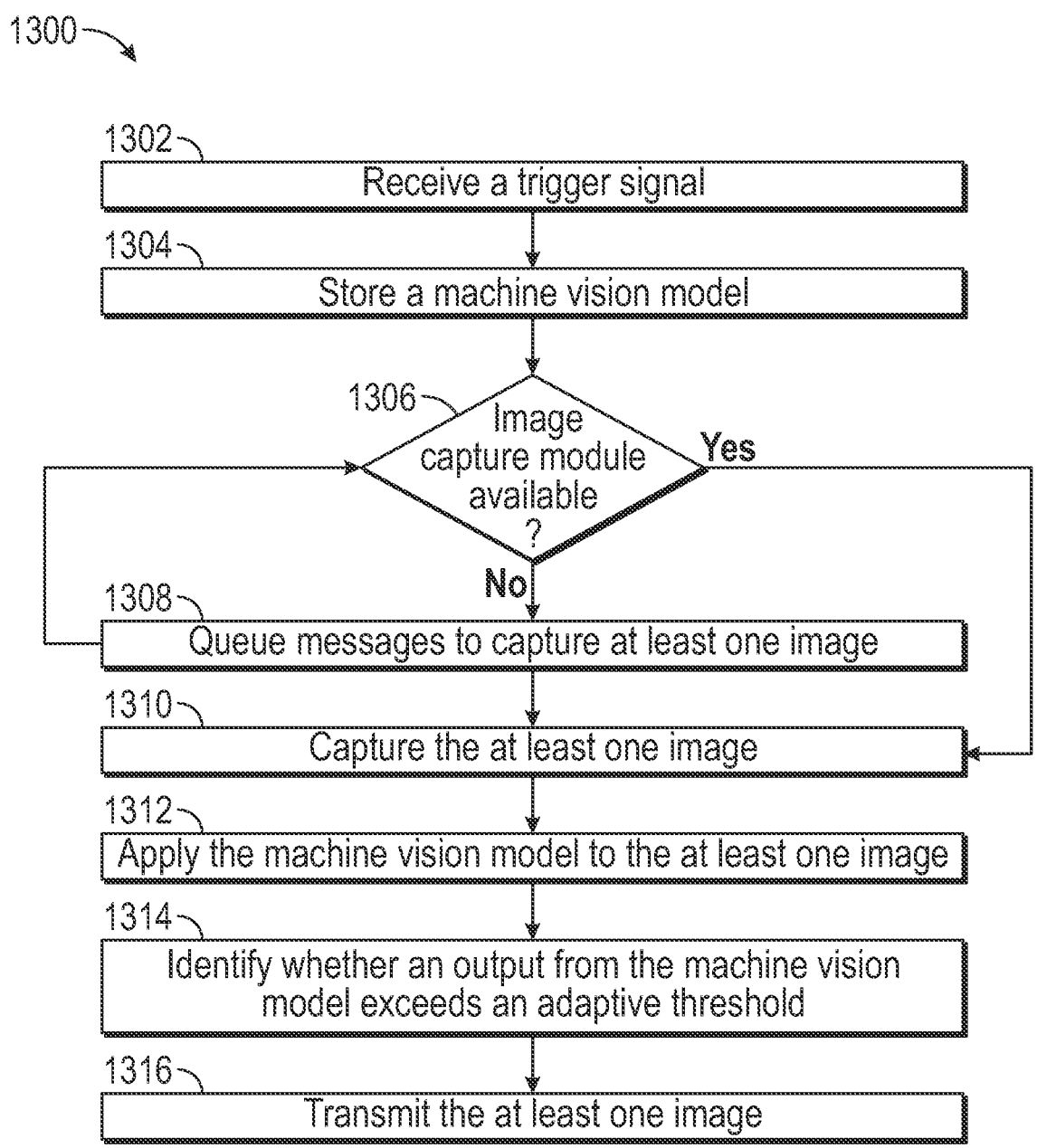
FIG. 13 illustrates an example flowchart exemplifying image capture control logic, in accordance with one or more embodiments of the present disclosure.

FIG. 13 illustrates a flowchart exemplifying image capture control logic 1300, in accordance with one or more embodiments of the present disclosure. The image capture control logic 1300 can be implemented as an algorithm on a computer processor (e.g., vital logic controller, microprocessor, FPGA, ASIC, server, etc.), a machine learning module, or other suitable system. Additionally, the image capture control logic 1300 can be achieved with software, hardware, firmware, an API, a network connection, a network transfer protocol, HTML, DHTML, JavaScript, Dojo, Ruby, Rails, other suitable applications, or a suitable combination thereof. The image capture control logic 1300 can interface electrical components to control mechanical components using logic processors.

In an embodiment, the image capture control logic 1300 can interface with a memory for storing at least one of image in response to the camera receiving the trigger signal thereon. Additionally, the image capture control logic 1300 can interface the memory with a networked computer processor operably coupled to the memory and capable of executing machine-readable instructions to perform program steps. The image capture control logic 1300 implementing hardware components (e.g., computer processor) can be capable of executing machine-readable instructions to control operation of the camera and transmit the at least one image.

The image capture control logic 1300 can leverage the ability of a computer platform to spawn multiple processes and threads by processing data simultaneously. The speed and efficiency of the image capture control logic 1300 can be greatly improved by instantiating more than one process for capturing at least one image. However, one skilled in the art of programming will appreciate that use of a single processing thread can also be utilized and is within the scope of the present disclosure. The image capture control logic 1300 can also be distributed amongst a plurality of networked computer processors. The image capture control logic 1300 of the present embodiment begins at step 1302.

Step 1302, in an embodiment, the control logic 1300 can receive a trigger signal. For example, the control logic 1300 can receive the trigger signal from a rotary encoder. The control logic 1300 can generate a message corresponding to the trigger signal. For example, the control logic 1300 can identify a high of the trigger signal indicating to the image capture module to capture an image. The control logic 1300 can generate the message based on the high of the trigger signal. In one embodiment, the message can be in a format accessible to the image capture module. For example, the message can include a payload including components such as a header, body, and instructions. The control logic 1300 can generate the message in response to receiving the trigger signal. In another embodiment, the control logic 1300 can generate messages based on a plurality of high values corresponding to the trigger signal.

In another embodiment, the trigger signal can be based on an electrical signal, signal values, samples, or metadata. In one embodiment, the control logic 1300 can identify the trigger signal based on the samples, where a high value of the samples can indicate a high of the trigger signal. The high of the trigger signal can indicate to the control logic 1300 to execute the image capture module to capture an image. The trigger signal can correspond to a smoothed signal in response to the averaged signals. For example, the smoothed signal can be a continuous signal without any erroneous pulses leading to optimum image captures. Alternatively, the trigger signal can include erroneous pulses due to the lost or unnecessary motion of the axle, resulting in a non-continuous signal executing the image capture module and capturing distorted images inconsistent with the motion of the vehicle. The averaged signals can result in the continuous signal and optimum image capture process. The control logic 1300 then proceeds to step 1304.

Step 1304, in an embodiment, the control logic 1300 can store a machine vision model to identify anomalies of the at least one image. For example, the control logic 1300 can instantiate the machine vision model stored in memory. The machine vision model can include software-based or firmware-based source code stored in the memory to execute in real-time. The control logic 1300 then proceeds to step 1306.

Step 1306, in an embodiment, the control logic 1300 can determine whether an image capture module is available to capture the at least one image. For example, each of the image capture modules can indicate to the control logic 1300 the current status of operations. In one embodiment, the control logic 1300 can receive status indicators such as a ready indicator such that the corresponding image capture module can be available to capture at least one image. Alternatively, the control logic 1300 can receive a busy indicator such that the corresponding image capture module is unavailable to capture at least one image. The control logic 1300 can receive status indicators from each of the image capture modules. The control logic 1300 can determine which of the image capture module is next available to capture at least one image. For example, the control logic 1300 can generate a work queue such that the control logic 1300 instructs the next available image capture module to capture at least one image. If one of the image capture modules is accessible, the control logic 1300 then proceeds to step 1310. If none of the image capture modules are accessible, the control logic 1300 then proceeds to step 1308.

Step 1308, in an embodiment, the control logic 1300 can queue messages to capture at least one image. For example, the control logic 1300 can receive and store the status indicators of the image capture modules. The control logic 1300 can store the status indicators locally in a data structure. For example, the control logic 1300 can generate a work queue to determine which of the next available image capture modules to instruct to capture at least one image. In one embodiment, the control logic 1300 continuously queries the image capture module for status indicators when the work queue is below a threshold. For example, when a number of available image capture module falls below the threshold, the control logic 1300 queries the image capture modules to determine a next available image capture module. The control logic 1300 then proceeds to step 1306.

Step 1310, in an embodiment, the control logic 1300 can capture the at least one image. For example, the control logic 1300 can identify a next image capture module to instruct to capture the at least one image. The control logic 1300 can determine the next image capture module based on the data structure organizing the order of the image capture modules to instruct to capture the at least one image. In one embodiment, the control logic 1300 can transmit an instruction to the image capture modules to capture at least one image individually or simultaneously. For example, the control logic 1300 can capture images while a vehicle is in motion. The control logic 1300 can instruct the image capture module to capture images of the environment surrounding the vehicle. In another embodiment, the control logic 1300 can capture a first image of a target. The control logic 1300 can capture a second image of the target while the vehicle is moved over the target. The control logic 1300 then proceeds to step 1312.

Step 1312, in an embodiment, the control logic 1300 can apply the machine vision model to the at least one image. For example, the control logic 1300 can instruct the machine vision model to analyze the at least one image. The machine vision model can identify whether there exists at least one anomaly from the at least one image. For example, the machine vision model can analyze the at least one image based on the control logic 1300 transmitting the at least one image from the image capture module to the machine vision model. The control logic 1300 can receive the at least one image from the image capture module in digital format, such that the at least one image can be converted into a stream of binary information. The control logic 1300 can receive the stream of binary information corresponding to the at least one image and transmit the stream of binary information to the machine vision model. The machine vision model can receive the stream of binary information. In one embodiment, the machine vision model can include technology and methods used to provide imaging-based automatic inspection and analysis for such applications as automatic inspection, process control, and robot guidance, usually in industry. For example, the machine vision model can apply a data analytic model to the stream of binary information. The data analytic model can include image processing algorithms, filtering algorithms, thresholding algorithms, or any sort of adaptive algorithms to identify anomalies from the at least one image. The control logic 1300 then proceeds to step 1314.

Step 1314, in an embodiment, the control logic 1300 can identify whether an output from the machine vision model exceeds an adaptive threshold. For example, the adaptive threshold can include values corresponding to filtering, thresholding, pixel counting, segmentation, edge detection, neural networks, deep learning, machine learning processing, or any other machine vision methods applicable. In one embodiment, the filtering can include software, firmware, or hardware to alter the at least one image such that the at least one image can be improved or changed under inspection. The thresholding can include setting or determining a gray value to separate portions of the at least one image, and to transform each portion of the at least one image to black and white based on whether it is below or above the grayscale value. The pixel counting can include counting the number of light or dark pixels from the at least one image. The segmentation can include partitioning the at least one image into multiple segments to simplify or change a representation of the at least one image into a digital object easier to parse for a computer. The edge detection can include finding edges within the at least one image. The neural networks, deep learning, and machine learning processing can include classification objects of the at least one image as "pass-fail" classification of identified objects. The control logic 1300 then proceeds to step 1316.

Step 1316, in an embodiment, the control logic 1300 can transmit the at least one image. For example, the control logic 1300 can transmit the at least one image to a computer over a network (e.g., the computer 150 and the network 160 in FIG. 1).

The present disclosure achieves at least the following advantages:
1. enables removal of erroneous pulses from trigger signals for accurate calibration of an image capture module in the field of use;
2. minimizes lost or unnecessary motion from poor fitting mechanical coupling as in current approaches;
3. enhances safety by removing distortion from images used to calibrate an image capture system for a locomotive; and
4. provides a portable system for calibration simplifying current calibration techniques.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) can be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure can be embodied in other specific forms without departing from the spirit or essential characteristics thereof. For example, each of the new structures described herein, can be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A system for monitoring a roadway by comparing captured images to identify image inconsistencies caused by lost or unnecessary motion, comprising:
   a mechanical coupler assembly operably coupled to an axle; and
   a rotary encoder, operably coupled to the mechanical coupler assembly, comprising:
   a memory configured to store signal samples corresponding to an electrical signal generated by the rotary encoder, and
   a processor configured to generate a trigger signal by performing the steps of:
   sampling an electrical signal generated in response to a rotation of the axle to generate electrical signal samples, comparing a first electrical signal sample with a second electrical signal sample when erroneous pulses are detected, updating at least one electrical signal sample when the first electrical signal sample is different from the second electrical signal sample, and generating a trigger signal based at least in part on the updated electrical signal samples, and at least one image capturing module including a camera and a lens, operably coupled to the rotary encoder and configured to acquire at least one high-resolution image when triggered by the trigger signal.

2. The system of claim 1, wherein when the processor updates the electrical signal samples, the processor is further configured to perform the steps of:

calculating an electrical signal sample average based on historic electrical signal samples;

replacing the electrical signal samples with the averaged electrical signal samples; and generating the trigger signal based at least in part on the averaged electrical signal samples.

3. The system of claim 1, wherein when the processor updates the electrical signal samples, the processor is further configured to replace the first electrical signal sample with the second electrical signal sample.

4. The system of claim 1, further comprising electrical signal sample metadata, including signal peak values of the electrical signal, a frequency of the electrical signal, an encoder rate, a rotation of the axle, or a transform of the electrical signal.

5. The system of claim 2, wherein the electrical signal sample average is based on a moving average of the electrical signal sample.

6. The system of claim 1, wherein the processor is further configured to perform the step of transmitting the trigger signal to the image capturing module.

7. The system of claim 1, wherein the erroneous pulses are present when the electrical signal includes electrical pulses out of sync with a rotation of the axle.

8. The system of claim 1, wherein the first electrical signal sample includes a voltage, an amplitude, and a frequency.

9. The system of claim 1, wherein the lost or unnecessary motion includes torsional rigidity, torsional stiffness, or slack.

10. A method for filtering erroneous pulses of an electrical signal to generate a trigger signal to capture images, comprising:

sampling an electrical signal generated in response to a rotation of an axle to generate electrical signal samples;

comparing a first electrical signal sample with a second electrical signal sample when erroneous pulses are detected;

updating at least one electrical signal sample when the first electrical signal sample is different from the second electrical signal sample; and generating a trigger signal based at least in part on the updated electrical signal samples.

11. The method of claim 10, further comprising:

calculating an electrical signal sample average based on historic electrical signal samples;

replacing the electrical signal samples with the averaged electrical signal samples; and generating the trigger signal based at least in part on the averaged electrical signal samples.

12. The method of claim 10, wherein when at least one electrical signal sample is updated, the first electrical signal sample is replaced with the second electrical signal sample.

13. The method of claim 10, further comprising metadata including signal peak values of the electrical signal, a frequency of the electrical signal, an encoder rate, a rotation of the axle, or a transform of the electrical signal.

14. The method of claim 11, wherein the electrical signal sample average is based on a moving average of the electrical signal sample.

15. The method of claim 11, further comprising transmitting the trigger signal to an image capturing module including a camera and a lens.

16. The method of claim 11, wherein the erroneous pulses are present when the electrical signal includes electrical pulses out of sync with a rotation of the axle.

17. The method of claim 11, wherein the first electrical signal sample includes a voltage, an amplitude, and a frequency.

18. The method of claim 11, wherein the erroneous pulses are due to lost or unnecessary motion of the axle.

19. The method of claim 18, wherein the lost or unnecessary motion includes torsional rigidity, torsional stiffness, or slack.

20. The method of claim 11, wherein the trigger signal causes at least one image sensor to acquire at least one high-resolution image.

* * * * *